(12) United States Patent
Christensen

(10) Patent No.: US 11,654,873 B1
(45) Date of Patent: May 23, 2023

(54) PARK RELEASE APPARATUS AND METHOD OF USE

(71) Applicant: AGA Tools & Products, Inc., Escondido, CA (US)

(72) Inventor: Hans Martin Christensen, Escondido, CA (US)

(73) Assignee: AGA Tools & Products, Inc., Escondido, CA (US)

( * ) Notice: Subject to any disclaimer, the term of this patent is extended or adjusted under 35 U.S.C. 154(b) by 184 days.

(21) Appl. No.: 17/088,072

(22) Filed: Nov. 3, 2020

Related U.S. Application Data

(60) Provisional application No. 62/932,277, filed on Nov. 7, 2019.

(51) Int. Cl.
  *B60T 7/10* (2006.01)
  *B60T 11/04* (2006.01)

(52) U.S. Cl.
  CPC ............. *B60T 7/102* (2013.01); *B60T 11/046* (2013.01); *B60T 7/108* (2013.01)

(58) Field of Classification Search
  CPC ........ B60T 7/102; B60T 11/046; B60T 7/108; F16H 2061/226; F16H 63/3491
  See application file for complete search history.

(56) References Cited

U.S. PATENT DOCUMENTS

| | | | |
|---|---|---|---|
| 7,883,126 B2 * | 2/2011 | Terry | G09F 3/0358 292/307 R |
| 8,300,389 B2 * | 10/2012 | Kang | H04M 1/7246 361/679.01 |
| 8,678,160 B2 * | 3/2014 | Weifels | F16H 63/3475 192/219.5 |
| 10,281,039 B2 * | 5/2019 | Dearden | F16C 1/145 |
| 10,697,542 B2 * | 6/2020 | Tucco | F16H 63/3491 |
| 2009/0151501 A1 * | 6/2009 | Jung | F16H 59/10 74/502 |

* cited by examiner

*Primary Examiner* — Thomas C Diaz
(74) *Attorney, Agent, or Firm* — Master Key IP, LLP; Jeromye V. Sartain

(57) ABSTRACT

A park release apparatus for shifting a transmission of a vehicle having an engine from park to neutral with the engine not running via a park release lever of the transmission, the apparatus including a transmission assembly configured for being selectively installed on the transmission spaced from the park release lever, a handle assembly, a cable assembly having a slidable cable operably connecting the transmission assembly and the handle assembly, and a release bracket coupled to the cable in the vicinity of the transmission assembly and configured for selectively engaging the park release lever.

28 Claims, 16 Drawing Sheets

PARK RELEASE APPARATUS AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/932,277 filed Nov. 7, 2019, and entitled "Park Release Apparatus and Method of Use." The contents of the aforementioned application are incorporated herein by reference.

BACKGROUND

The subject of this patent application relates generally to automotive tools and parts, and more particularly to a park release apparatus configured for being temporarily or permanently installed on a vehicle's transmission to facilitate shifting the transmission from park to neutral with the engine not running.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, various automotive vehicles (makes and models), including but not limited to certain BMW E series and F series vehicles starting in approximately the year 2013, incorporate a ZF 8HP transmission in both two- and four-wheel-drive configurations. One issue with this particular ZF transmission is that in most vehicles there is provided no means of manually disengaging the transmission from park if the engine is not running, and so in these vehicles there is no convenient means to enable manually taking the vehicle out of park when such feature is not provided in original manufacturing. That is, in such vehicles, the engine must be running in order for the transmission pump driven by the engine to generate pressure in order to operate the vehicle's internal hydraulic park release. As such, a dead battery or any other issue preventing the engine from starting thus prevents the vehicle from being taken out of park and placed in neutral, which results in the transmission and wheels of the vehicle being locked and the vehicle not being movable.

Accordingly, with a vehicle having such a ZF transmission being dead or otherwise not able to run (the engine not able to be started), an owner, tow truck operator, mechanic, or any other person wishing to move the vehicle must manually shift the vehicle from park to neutral employing a small lever on the transmission itself, which in most cases involves first removing the vehicle's under panel, a task that is at best inconvenient and at worst impossible without the required tools available. But the bigger concern is taking the vehicle out of park once the transmission "park release" lever is accessed. The transmission being centrally located in the vehicle and the lever being small, it cannot be actuated to shift the car into neutral without the operator being at least partially under the vehicle, which presents obvious and significant risk, particularly if the vehicle is on an incline and/or a wheel chuck or the like is not available.

What has been needed and heretofore unavailable is an after-market automotive tool or part that conveniently enables an operator to safely shift a vehicle's ZF transmission or the like from park to neutral even with the engine not operational and with the operator safely inside the vehicle so as to have control of the vehicle's steering and brake, or at least not under the vehicle. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a park release apparatus configured for enabling an operator to safely shift a vehicle's transmission from park to neutral even with the engine not operational and with the operator safely inside or at least not under the vehicle. In at least one embodiment, the park release apparatus comprises a transmission assembly and a handle assembly interconnected by a cable assembly, the transmission assembly operably engaging the park release lever of the transmission, and the handle assembly being operable via the cable assembly to selectively shift the park release lever out of park via the transmission assembly.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
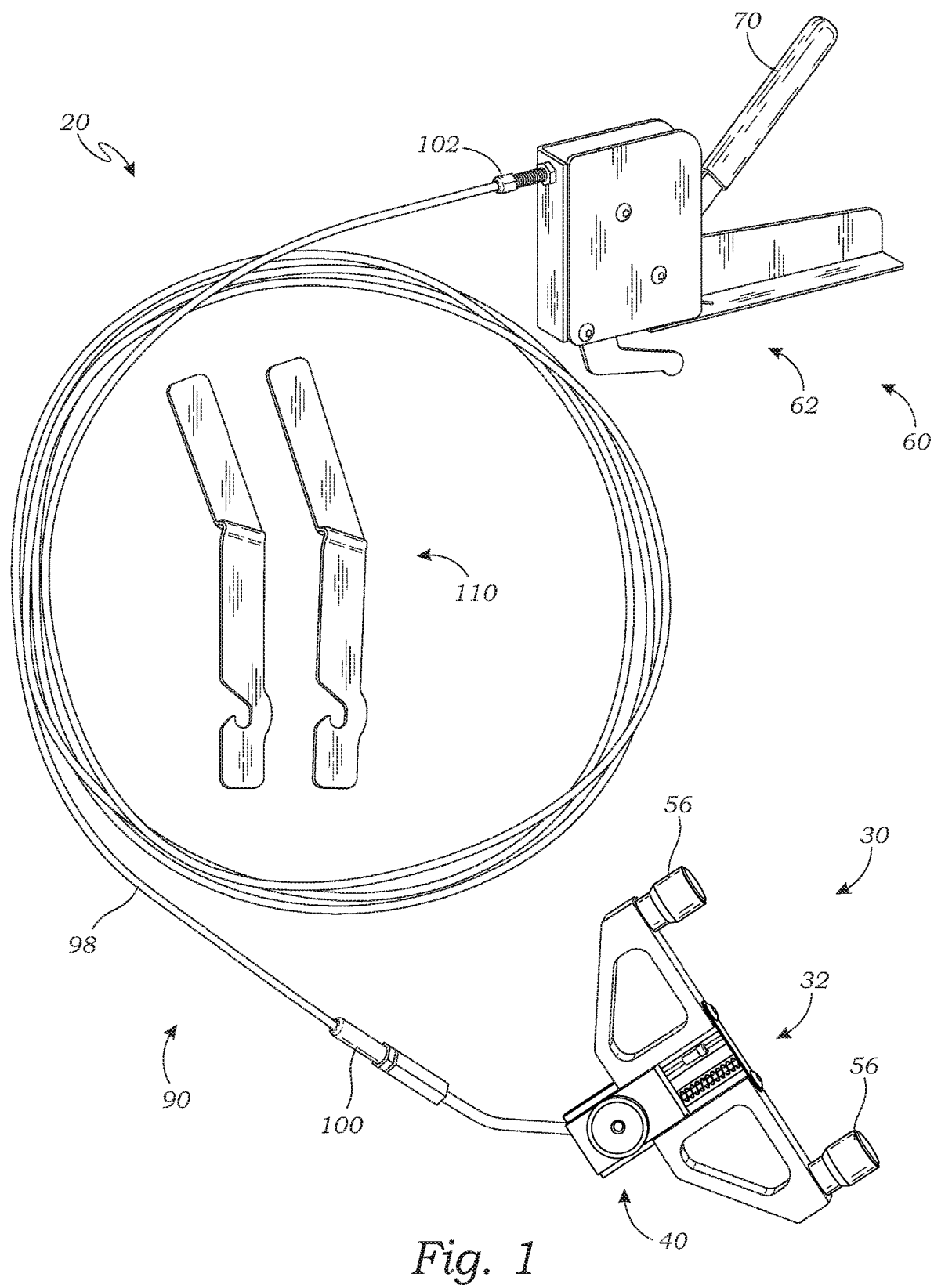
FIG. 1 is a perspective view of an exemplary park release apparatus, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

Turning now to FIG. 1, there is shown a perspective view of an exemplary embodiment of a park release apparatus 20 according to aspects of the present invention. The apparatus 20 comprises, in the exemplary embodiment, a transmission assembly 30 and a handle assembly 60 interconnected by a cable assembly 90. Also included in the kit-type apparatus 20 is at least one release bracket 110 that in one illustrated embodiment operably engages between the park release lever L of a vehicle's transmission T (FIG. 7) and the transmission assembly 30 as mounted or installed on the transmission T, more about which is said below in connection with FIGS. 7-11 illustrating the exemplary embodiment of a park release apparatus 20 according to aspects of the present invention in use in various operational modes. More generally, it will be appreciated that any such park release apparatus 20 is a purpose-built automotive tool or part designed and configured for operably engaging a particular transmission for a particular purpose, though features and aspects of the invention may certainly be reconfigured for, adapted to, or otherwise formed or assembled for operable use in connection with other vehicle transmissions or applications without departing from the spirit and scope of the invention. As shown in the illustrated embodiment, the transmission assembly 30 of the park release apparatus 20 generally comprises a transmission assembly body 32 in which is operably installed a selectively movable actuator 40 and on which is operably installed at least one coupler 56, while the handle assembly 60 generally comprises a handle assembly body 62 in which is operably installed a pivotable or rotatable handle 70 that operably engages one end of the cable assembly 90 while the opposite end of the cable assembly 90 is operably engaged with the transmission assembly 30, and more particularly in the exemplary embodiment the movable actuator 40. The overall length of the cable assembly 90 can vary as needed or desired in terms of setting the physical distance between the transmission assembly 30 and the handle assembly 60 during use, as will be particularly appreciated in connection with use of the park release apparatus 20 such as illustrated in FIG. 12, such that the relative size or length of the cable assembly 90 illustrated in FIG. 1 is to be understood as schematic and non-limiting. As shown in FIG. 1, the cable assembly 90 generally comprises a sheath 98 in which a cable 92 (FIG. 2) is slidably installed and a first connector 100 coupling the sheath 98 to the transmission assembly 30 and an opposite second connector 102 coupling the sheath 98 to the handle assembly 60.

Figure 2:
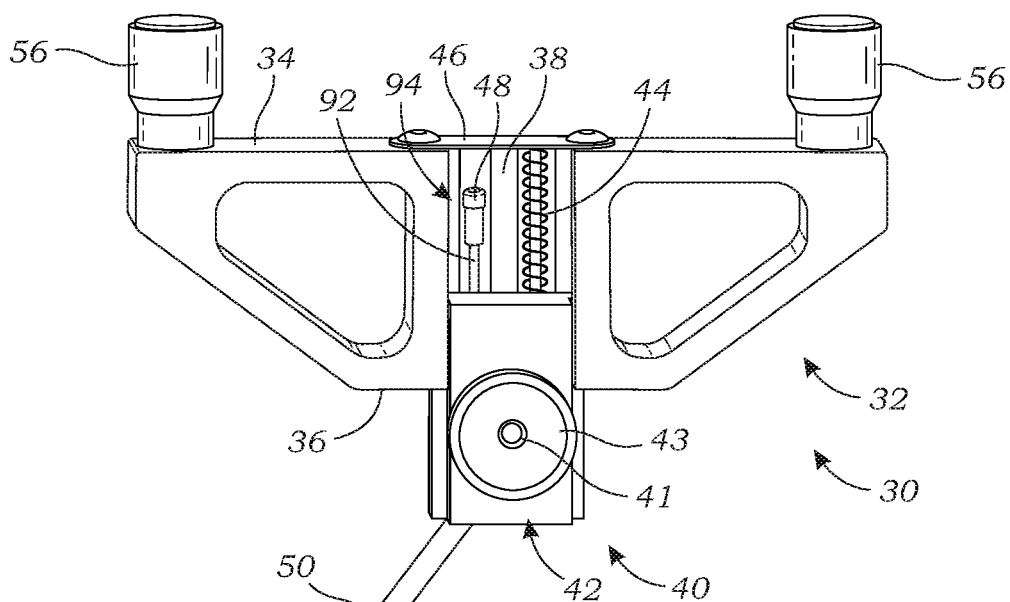
FIG. 2 is an enlarged perspective view of a transmission assembly thereof, in accordance with at least one embodiment.

With continued reference to FIG. 1 and now also the enlarged perspective view of FIG. 2, the exemplary transmission assembly 30 again generally comprises a transmission assembly body 32 in which is operably installed a selectively movable actuator 40 and on which is operably installed at least one coupler 56. The transmission assembly body 32 is formed having at least a distal first wall 34 and an opposite proximal second wall 36. The body 32 may be formed with side walls and recesses also as needed or desired, all of which in a variety of configurations beyond that shown and described. The first wall 34 defines an overall width of the transmission assembly body 32, which it will be appreciated may be dictated by the intended use of the transmission assembly 30 and thus the overall park release apparatus 20. More particularly, in the exemplary embodiment, two couplers 56 are installed on opposite ends of the distal first wall 34 of the body 32 so as to extend distally therefrom. Each coupler 56 may be formed from or incorporate, in whole or in part, a magnetic material or element, such that by shaping the couplers 56 as appropriate, each coupler 56 may be selectively magnetically attached to a particular feature of the vehicle's transmission T (FIG. 7) or other part of the vehicle, in the exemplary embodiment such feature being two adjacent bolts B that assemble the case C (FIG. 7) of the transmission T, on which basis the spacing of the couplers 56 would substantially correspond to the spacing of adjacent transmission bolts B, more about which is said below. A channel 38 is formed within the transmission assembly body 32 substantially between the first and second walls 34, 36 for slidable receipt of the actuator 40. The actuator 40 is biased proximally within the channel 38 by an actuator spring 44, with a stop plate 46 installed on the distal first wall 34 of the body 32 spanning the channel 38 so as to retain the actuator 40 and actuator spring 44 within the channel 38. Installed on the proximal second wall 36 of the transmission assembly body 32 and extending somewhat proximally therefrom and positioned therealong so as to be offset from the channel 38 is a cable guide 50 through which is fed the internal cable 92 of the cable assembly 90 slidably installed within the sheath 98, the sheath 98 being operably installed on the cable guide 50 via the first connector 100, such that the distal first end 94 of the cable 92 operably engages the actuator 40 within the channel 38. As illustrated, the first end 94 of the cable 92, or specifically its terminus 48, is visible in the channel 38 above or distal of the actuator 40, though this of course is not necessarily so. Fundamentally, the cable 92, whether or not via the cable terminus 48, is mechanically coupled at its first end 94 with the actuator 40 such that as the cable 92 slides or shifts within and relative to the sheath 98, the actuator 40 slides or shifts within and relative to the channel 38 and thus the overall transmission assembly body 32. The actuator 40 is further formed as having an actuator post 42 extending laterally therefrom and configured for selective engagement with a release bracket 110 during use, such that as the actuator 40 is shifted via the cable 92 so also is the release bracket 110, again, which will be further appreciated particularly with reference to the below discussion regarding the exemplary park release apparatus 20 in use as illustrated in FIGS. 7-12. Those skilled in the art will appreciate once more that while a particular configuration of the transmission assembly 30 is shown and described, the invention is not so limited and may take numerous other forms according to aspects of the present invention without departing from its spirit and scope, as will be further appreciated with reference to the alternative exemplary embodiments of FIGS. 13 and 14 discussed further below.

Figure 3:
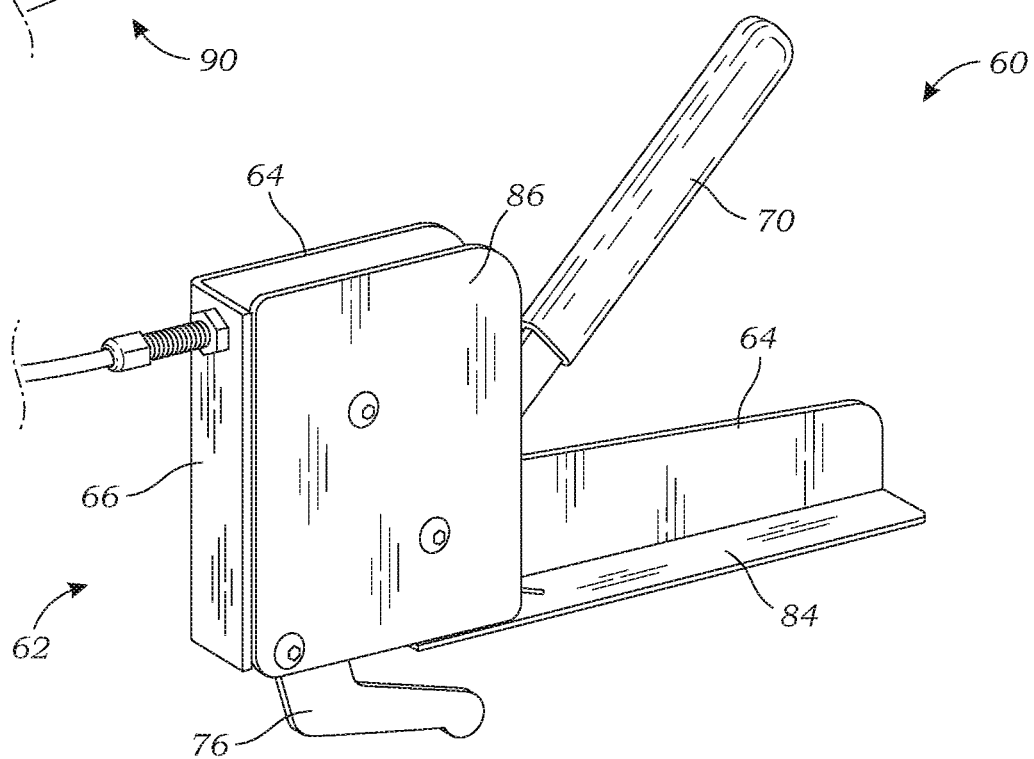
FIG. 3 is an enlarged perspective view of a handle assembly thereof, in accordance with at least one embodiment.
Figure 4:
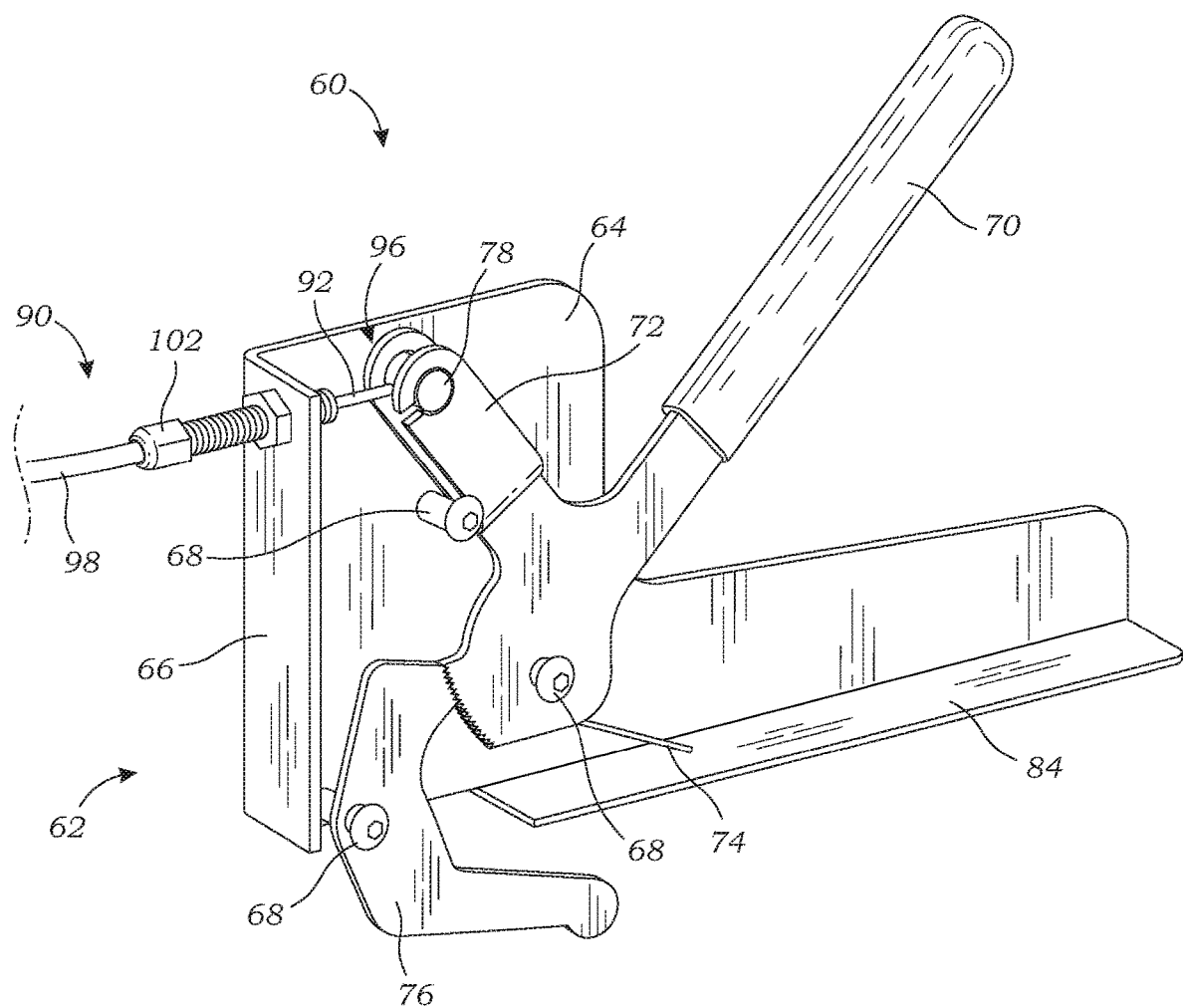
FIG. 4 is a further enlarged partial perspective view of the handle assembly of FIG. 3, in accordance with at least one embodiment.

Referring next to FIGS. 3 and 4, there are shown enlarged perspective views of the exemplary handle assembly 60 of the exemplary park release apparatus 20 according to aspects of the present invention of FIG. 1. The illustrated handle assembly 60 again generally comprises a handle assembly body 62 in which is operably installed a pivotable or rotatable handle 70 that operably engages one end of the cable assembly 90. The handle assembly body 62 comprises a first wall 64 on which the handle 70 is operably installed and a second wall 66 on which the cable assembly 90 is operably installed via the second connector 102, which body 62 may again be formed with additional walls and other features as needed or desired in a variety of configurations beyond that shown and described. With particular reference to FIG. 4, the handle 70 is pivotally mounted on a fastener 68 that is assembled on the first wall 64, which one or more fastener 68 also supports assembly of a cover 86 that is removed in FIG. 4 for clarity in viewing the internal components of the handle assembly 60. The handle 70 is formed proximally with a handle linkage 72 having at its free end a cable terminus 78 to which the second end 96 of the cable 92 is connected. Accordingly, it will be appreciated that the location of the second connector 102 for operable installation of the cable assembly 90 with the handle assembly 60, or more particularly the cable sheath 98 with the second wall 66 of the handle assembly body 62, is substantially adjacent to or offset from the cable terminus 78 installed in the free end of the handle linkage 72. As such, those skilled in the art will appreciate that with the cable 92 thus fed through the sheath 98 and second connector 102 so as to connect its second end 96 with the cable terminus 78 operably installed on or in the handle linkage 72, pivoting the handle 70 and thus the handle linkage 72 about the post or fastener 68 on which the handle 70 is installed serves to shift the location of the cable terminus 78 and thus the second end 96 of the cable 92 relative to the cable sheath 98 and second connector 102, and thus relative to the handle assembly body 62, thereby selectively pulling in or tightening or letting out or loosening the cable 92. It will be further appreciated with reference to FIG. 2 and the above discussion that as the handle 70 is squeezed, or in the view of FIG. 4 as the handle 70 is rotated clockwise about the mounting fastener 68, the handle linkage 72, shifts away from the front or second wall 66 of the handle assembly body 62 and thus away from the cable sheath 98 and second connector 102, thereby pulling or tightening the cable 92, which in turn pulls or shifts the first end 94 of the cable 92 at the transmission assembly 30 and thus the actuator 40 within the channel 38 of the transmission assembly body 32, which it will again be further appreciated, particularly from FIGS. 10 and 11, serves to shift both the actuator 40 and thus the transmission park release lever L downwardly relative to the transmission T via the release bracket 110 so as to in turn shift the transmission T out of park and into neutral, more about which is said below. As shown, the first wall 64 of the handle assembly body 62 may be further formed with a handle grip 84 opposite the handle 70 to facilitate shifting or pivoting the handle 70 as by squeezing the handle 70 relative to or toward the grip 84. As shown in FIG. 4, the handle 70 may be configured to frictionally engage a separate handle release 76 that is also pivotally installed on the first wall 64 of the handle assembly body 62 adjacent to and offset from the handle 70 via another fastener 68, the handle release 76 serving to selectively engage and lock the handle 70 in an actuated position against a handle spring 74 configured to bias the handle 70 away from the handle grip 84, or counter-clockwise in the view of FIG. 4, and thus bias the handle 70 effectively open or the handle linkage 72 and its cable terminus 78 toward the front or first wall 64 and thus the cable 92 toward the transmission assembly 30 or toward a loosened position so as to take tension off of the actuator 40. As such, it will be appreciated that in the exemplary embodiment, the overall park release apparatus 20 is biased toward the handle 70 being opened and thus effectively toward the transmission T being in park, whereas the transmission T can be shifted out of park and temporarily or selectively locked in neutral as by actuating the handle 70 and it being locked against the biasing effect of the handle spring 74 by the handle release 76. In the illustrated embodiment, the handle 70 and handle release 76 engage via or along respective serrations or teeth, though it will be appreciated that any such features now know or later developed may be employed. To thus actuate the handle 70 and shift the transmission T into neutral during use of the park release apparatus 20, the handle 70 is squeezed toward the handle grip 84 to a desired position and locked in such position via the handle release 76, and then when the handle 70 is to be shifted back open, with or without further squeezing the handle 70 so as to "unload" it, the handle release 76 may itself be actuated as by pushing up on its free end toward the handle assembly body 62, or in the view of FIG. 4 rotating the handle release 76 counter-clockwise about its mounting fastener 68, to effectively disengage the handle release 76 from the handle 70 and thereby allow the handle 70 to rotate open or counter-clockwise under the influence of the handle spring 74. Also as illustrated, yet another fastener 68 may be installed on the first wall 64 of the handle assembly body 62 adjacent to the handle linkage 72 to serve as a stop for the linkage 72 and thus for the handle 70 in its open or unactuated position as biased by the handle spring 74. Again, one or more such fastener 68 may also be employed in assembling the cover 86 onto the handle assembly body 62 to enclose the internal moving parts of the handle assembly 60, and any such fastener 68 may take any appropriate form now known or later developed. More generally, it will again be appreciated that while a particular arrangement of the handle assembly 60 and its various components is shown and described, such is to be understood as merely illustrative of features and aspects of the present invention and expressly not limiting, such as with reference to the alternative exemplary embodiment of FIG. 15 discussed further below.

Figure 5:
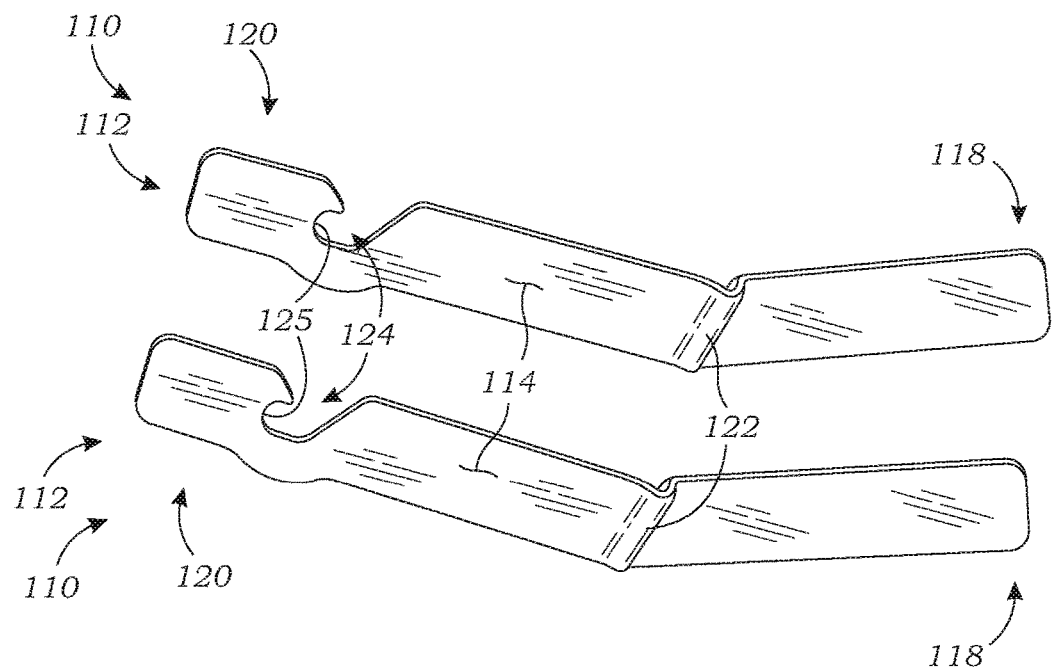
FIG. 5 is an enlarged front perspective view of a pair of release brackets thereof, in accordance with at least one embodiment.
Figure 6:
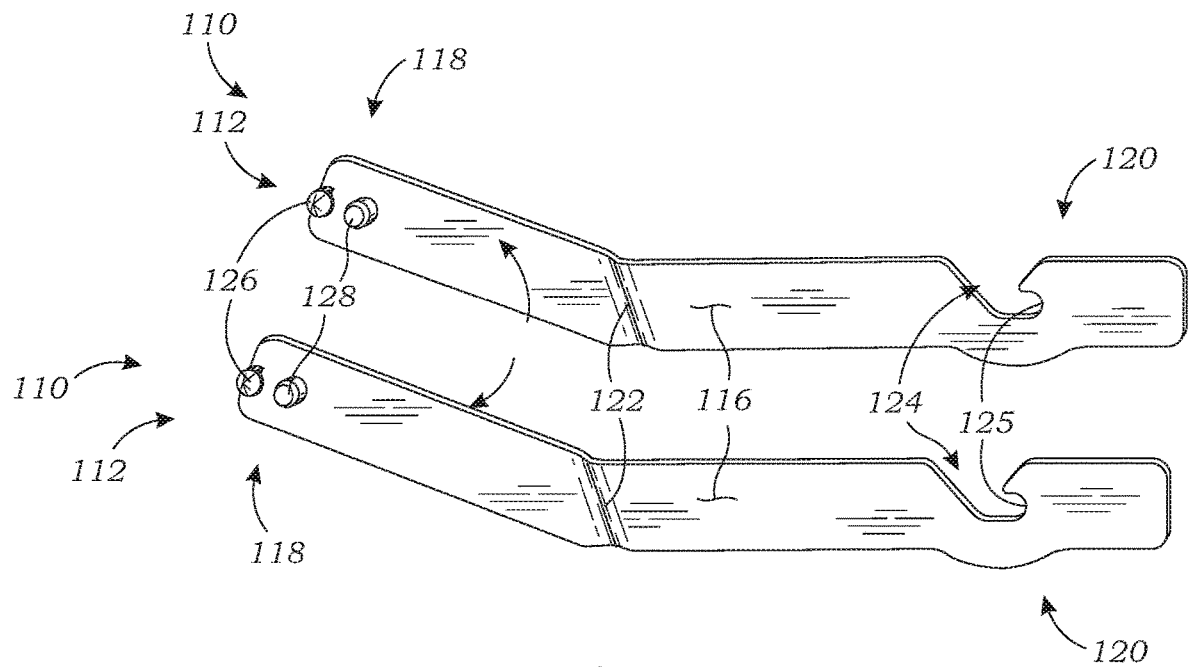
FIG. 6 is a rear perspective view of the pair of release brackets of FIG. 5, in accordance with at least one embodiment.
Figure 7:
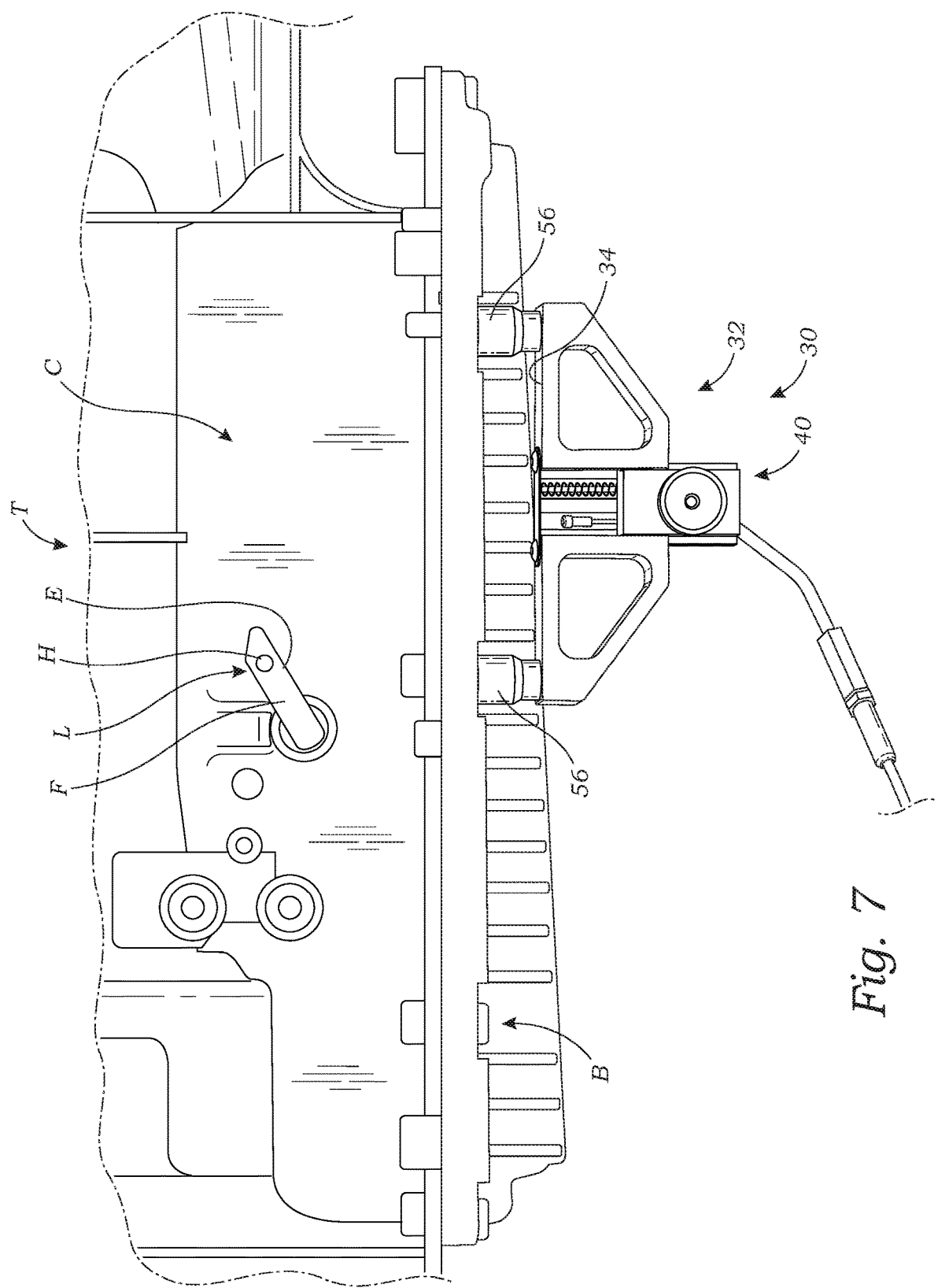
FIG. 7 is a reduced scale partial perspective view of the park release apparatus of FIG. 1 in a first operational mode as installed wherein the transmission assembly of FIG. 2 is mounted on a transmission, in accordance with at least one embodiment.

Turning to FIGS. 5 and 6, there are shown enlarged front and back perspective views of a pair of exemplary release brackets 110 of the exemplary park release apparatus 20 according to aspects of the present invention as illustrated in FIG. 1. Each release bracket 110 is generally configured as a somewhat flat release bracket body 112 having an intermediate bend 122 formed therein, which bend 122 is configured both for providing a slight angle to the overall release bracket body 112 and for clearance thereof relative to features of the transmission T and particularly the case C in the vicinity of its joint secured by the bolts B (FIG. 7). The release bracket body 112 thus defines a relatively elongate, flat member having an outward surface 114 and an opposite inward surface 116. At a proximal second end 120 of the release bracket body 112 there is formed a notch 124 intersecting the outward and inward surfaces 114, 116 of the release bracket body 112 or passing through the thickness of the release bracket body 112, the notch 124 configured for selective engagement with the actuator post 42 formed on the actuator 40 of the transmission assembly 30 (FIGS. 1 and 2). Particularly, the actuator post 42 may be formed having a circumferential undercut at least as wide as the release bracket body 112 is thick so that the body 112 in the vicinity of and as facilitated by the notch 124 thereof may selectively slip into the undercut so as to be effectively coupled at its proximal second end 120 with the actuator post 42. In the exemplary embodiment of the transmission assembly 30 of FIGS. 1 and 2, the actuator post 42 and its related undercut is formed via a stud 41 mounted on the actuator 40 and a cap 43 installed or formed on the stud 41 to space the cap 43 from the actuator 40, thereby forming the undercut, in which case the undercut or the exposed height or standoff distance of the stud 41 is greater than or equal to the thickness of the release bracket body 112 in the vicinity of the notch 124. As such, in one illustrated embodiment, the cap 43 has a diameter greater than that of the stud 41 to define the undercut and may further have a diameter that is greater than the width of the release bracket body 112 again in the vicinity of the notch 124, while the diameter of the stud 41 is substantially equivalent to that of the fillet 125 defining the bottom or proximal end of the notch 124 to further facilitate retention of the release bracket 110 on the transmission assembly actuator 40 during use. On the inward surface 116 at the opposite distal first end 118 of the release bracket body 110 there are formed two offset pins: a distal engagement pin 126 for selectively engaging a hole H formed on the transmission park release lever L (FIGS. 7 and 8) and a proximal locator pin 128 for selectively slidably engaging a bottom edge E of the park release lever L (FIGS. 7 and 8), more about which is said below particularly in connection with FIG. 8. The disclosed release bracket 110 is shown in two slightly different sizes for illustration in connection particularly with the exemplary context of ZF-style 8HP transmissions that underwent a slight case change in about the year 2014; however, it will be appreciated that such variations could alternatively be accommodated by a single release bracket 110 configuration, and more generally that any such release bracket 110 in one or more sizes beyond that shown and described may be configured and provided as part of a park release apparatus 20 according to aspects of the present invention without departing from its spirit and scope. Dimensionally, staying with the illustrated pair of slightly different release brackets 110, the straight-line distance from the center of the engagement pin 126 to the center of the notch fillet 125 is in one release bracket approximately six and three tenths inches (6.3 in.) and in the other release bracket is approximately six and six tenths inches (6.6 in.), though it will again be appreciated that a wide range of configurations and sizes of the release bracket 110 are possible according to aspects of the present invention without departing from its spirit and scope, it being further appreciated that such distances effectively relate to the particular context of the illustrated transmission T with its particular park release lever L and location of the hole H thereon and also to the illustrated transmission assembly 30 and the configuration and location of the actuator 40 thereof and its related actuator post 42, once more, the release bracket 110 effectively coupling the park release lever L and the transmission assembly actuator 40 during use.

Referring next to FIG. 7, in use of a park release apparatus 20 according to aspects of the present invention as shown in FIGS. 1-6, once access to the transmission T is gained such as by removing any under panel or other parts (not shown), the first step is to temporarily install the transmission assembly 30 on the transmission T. As shown, with the transmission assembly 30 oriented somewhat upwardly or vertically or with the distal transmission assembly body first wall 34 oriented toward the transmission T, the coupler 56 on the left of the transmission assembly body 32 is positioned adjacent to the center transmission bolt B or the bolt B closest to and somewhat vertically aligned with the park release lever L and the coupler 56 on the right is positioned adjacent to the right transmission bolt B. Such couplers 56 again in the exemplary embodiment being configured with magnetic material or elements, when they are brought in sufficient proximity to the transmission bolts B, they simply magnetically engage the bolts B to removably secure the transmission assembly 30 on the transmission T as shown. Those skilled in the art will appreciate that a variety of other configurations and attachment means of the couplers 56 are possible according to aspects of the present invention, whether now known or later developed, an advantage of magnetic or other such engagement being that no tools are required and that such engagement is non-permanent and can be performed with one hand by effectively just "snapping" the transmission assembly 30 in place. In this first operational mode of the transmission assembly 30, it will be observed and appreciated that the actuator is in its "at rest" or downwardly biased position, ready for selective engagement with an appropriate release bracket 110 (FIGS. 1, 5 and 6).

Figure 8:
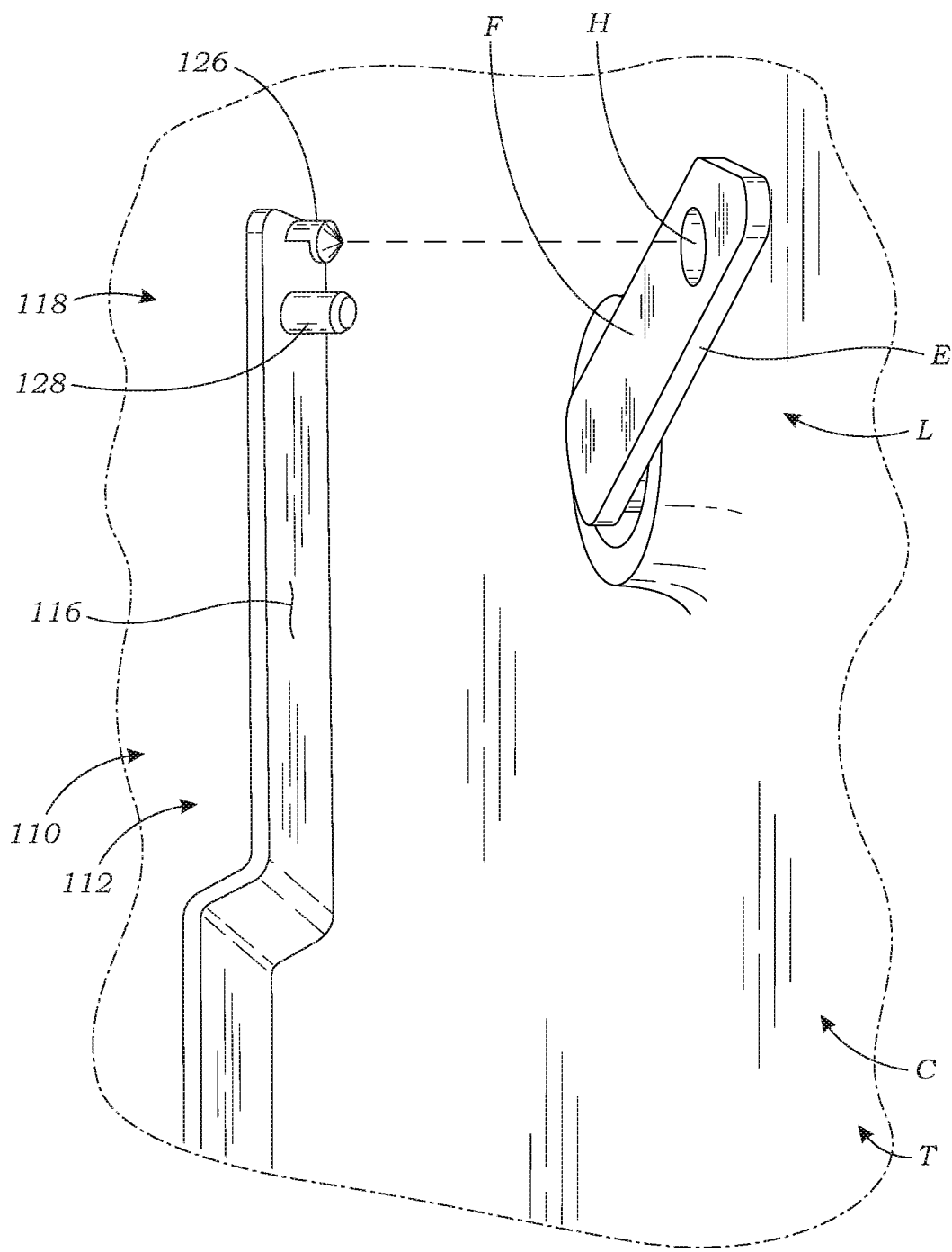
FIG. 8 is an enlarged partial perspective view of a release bracket of FIGS. 1, 5 and 6 being engaged with a park release lever of the transmission, in accordance with at least one embodiment.
Figure 9:
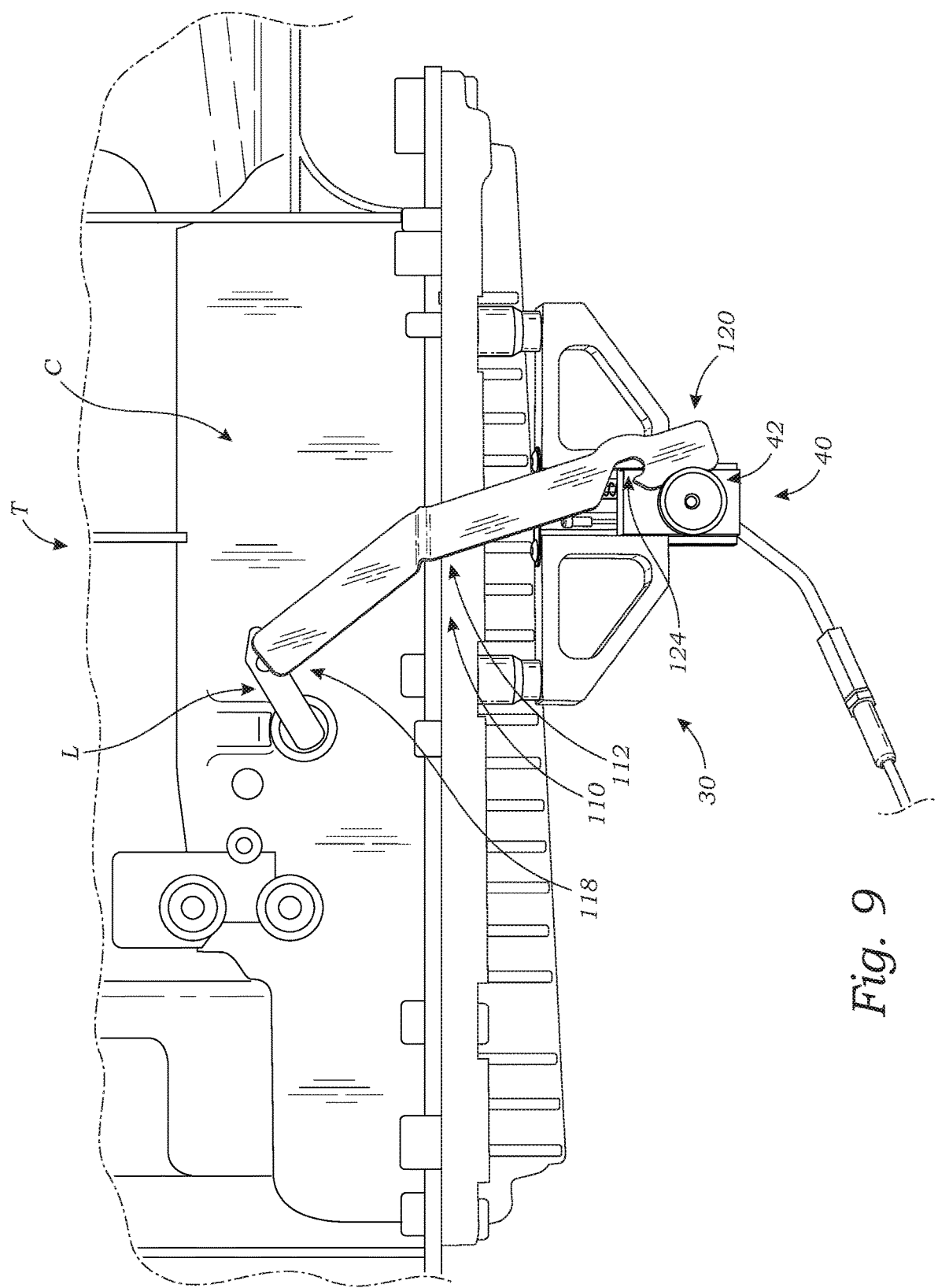
FIG. 9 is a reduced scale partial perspective view of the park release apparatus of FIG. 1 in a second operational mode as installed wherein the release bracket of FIG. 8 is engaged with the park release lever at one end and at its opposite end is adjacent to an actuator of the transmission assembly mounted on the transmission as in FIG. 7, in accordance with at least one embodiment.

Turning then to FIGS. 8 and 9, in a second step, the selected release bracket 110 is oriented with its inward surface 116 toward the transmission T and its distal or first end 118 somewhat adjacent to or offset from the park release lever L as shown particularly in FIG. 8. From beneath the vehicle alongside the transmission T as shown in FIG. 7, it will be appreciated once more that the general vertical location of the park release lever L can be found based on the location of the center transmission case bolt B and thus the left end and coupler 56 of the transmission assembly 30. By then vertically lifting the release bracket 110 from such aligned location again with its inward surface 116 facing the transmission case C, the upper first end 118 of the bracket 110 would make contact with the park release lever L, and specifically the locator pin 128 with the bottom edge E of the lever L. That is, as best seen in FIG. 8, the locator pin 128 is relatively longer than the offset engagement pin 126 that is to ultimately be seated in the lever hole H, such that the locator pin 128 may abut the lever bottom edge E as the engagement pin 126 contacts the outwardly-oriented lever face F. As such, once the locator pin 128 makes contact with the lever's bottom edge E, the pin 128 may ride along the lever edge E as the upper end 118 of the release bracket 110 is shifted laterally along the lever L, and particularly the engagement pin 126 along the lever face F, until the engagement pin 126 is positioned opposite and drops into the lever hole H. Those skilled in the art will appreciate that by spacing the engagement pin 126 from the locator pin 128 by an amount substantially equivalent to the distance from the lever edge E to the lever hole H, alignment of the engagement pin 126 with the hole H is assured so long as the locator pin 128 is in contact with the bottom edge E of the lever L. It will be further appreciated that such configuration of the release bracket 110 again facilitates convenient one-hand installation of the release bracket 110 on the park release lever L even in tight quarters underneath the vehicle V (FIG. 12). It will also be appreciated in this context that the locator pin 128 is substantially cylindrical or otherwise has a sufficiently square side wall or surface to achieve and maintain contact with the lever lower edge E, while the engagement pin 126 may be formed having a tapered end opposite the release bracket body 112 coming somewhat to a point to further facilitate locating the engagement pin 126 in the lever hole H. The engagement pin 126 may even be further formed with an undercut to better secure the engagement pin 126 in the lever hole H during use. Thus, as shown in FIG. 9 illustrating the park release apparatus 20 in a second operational mode, the upper or distal first end 118 of the release bracket 110 is engaged with the park release lever H as described above in connection with FIG. 8, with the lower or proximal second end 120 of the release bracket 110 adjacent to the actuator 40 of the transmission assembly 30 but the notch 124 thereof not yet engaged with the actuator post 42, the lower end 120 of the bracket assembly body 112 simply resting adjacent to the post 42.

Figure 10:
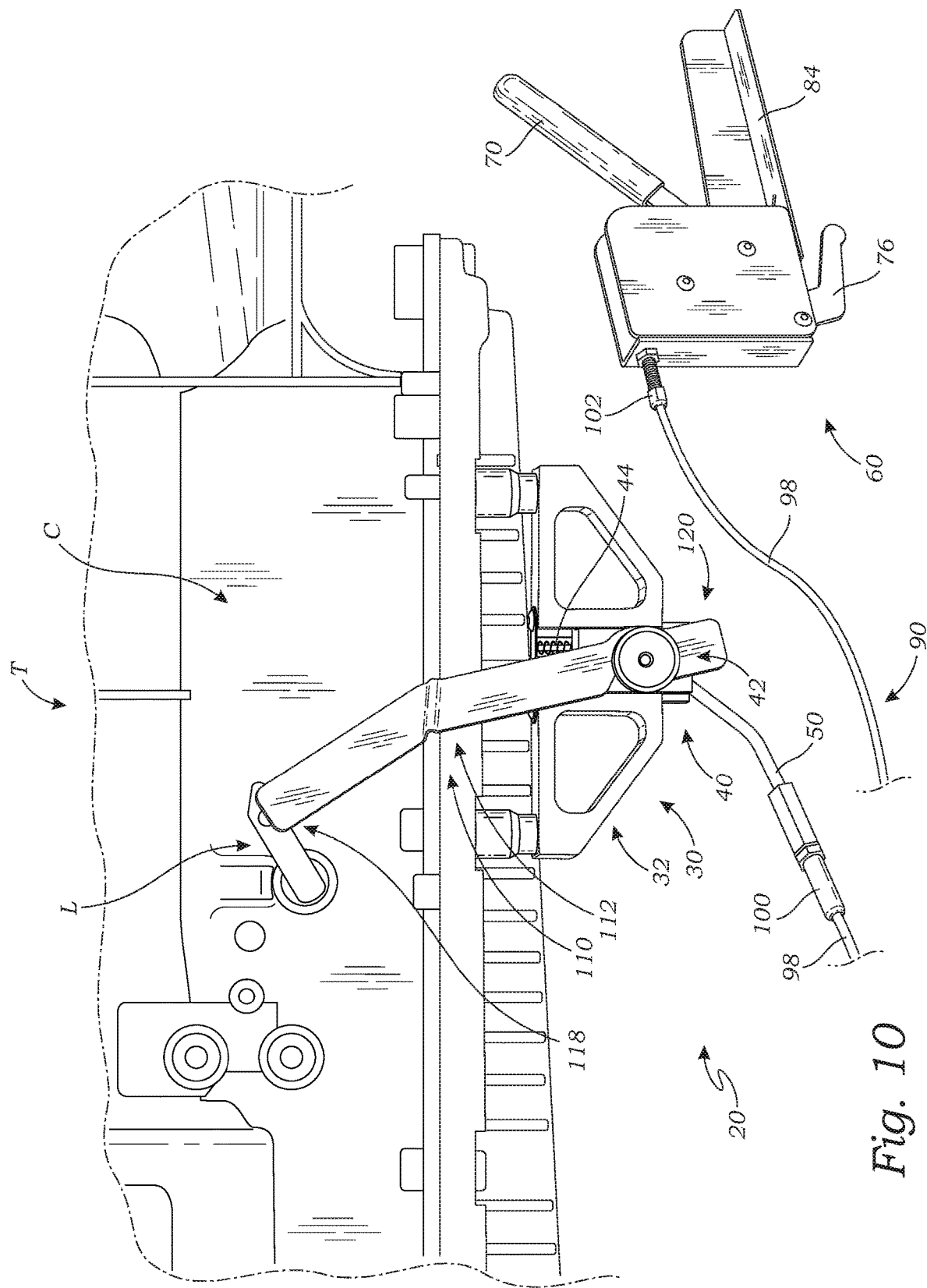
FIG. 10 is a reduced scale partial perspective view of the park release apparatus of FIG. 1 in a third operational mode as installed wherein the release bracket of FIGS. 8 and 9 is engaged with the park release lever at one end and at its opposite end is engaged with the actuator of the transmission assembly mounted on the transmission as in FIG. 7, further showing the handle assembly of FIGS. 1, 3 and 4 nearby and ready for operation, in accordance with at least one embodiment.

Referring next to FIG. 10 illustrating the exemplary park release apparatus 20 in use in a third operational mode following from the second operational mode of FIG. 9, here, the actuator 40 is shifted upwardly or distally within the channel 38 (FIG. 2) formed in the transmission assembly body 32 against the biasing effect of the actuator spring 44 so that the actuator post 42 is brought adjacent to the notch 124 (FIGS. 5, 6 and 9) formed in the lower end 120 of the release bracket body 112, at which point gravity or a slight nudge of the lower end 120 toward the left or toward the post 42 will serve to engage the notch 124 with the post 42, it being appreciated that then once the actuator 40 is released the spring 44 will again bias the actuator 40 downwardly or proximally so as to fully seat the post 42 within the notch 124 and be retained therein. The actuator spring 44 thus biases the actuator 40 and therefore the release bracket 110 and the transmission park release lever L itself downwardly or the transmission T toward neutral, but it will be appreciated that the actuator spring 44 alone is not sufficient to actually shift the transmission T out of park, instead simply providing a relatively slight biasing effect to ensure continued positive engagement between the release bracket 110, and its notch 124 specifically, with the actuator post 42 formed on the actuator 40. As such, once more, the exemplary overall park release apparatus 20 via the handle assembly 60 and the park release lever L itself are effectively biased toward the vehicle's transmission T remaining in park, or toward the configuration of such components in effectively the default or "at rest" position illustrated in FIG. 10. As such, it will be appreciated that in the illustrated third operational mode of the park release apparatus 20, the transmission assembly 30 is effectively coupled with the park release lever L of the transmission T via the release bracket 110, and specifically the engagement of the engagement pin 126 (FIG. 8) at the bracket's upper end 118 with the hole H in the park release lever L and of the notch 124 (FIG. 9) at the bracket's lower end 120 with the actuator post 42. In this configuration of the park release apparatus 20, it will be further appreciated that pulling down on the transmission assembly actuator 40 will translate via the release bracket 110 to pulling down on the park release lever L so as to shift the transmission T out of park and into neutral. Before doing so, and in the configuration of the park release apparatus 20 as shown in FIG. 10 that is prior to but ready for any such actuation, the handle assembly 60 operably coupled to the transmission assembly 30 through the cable assembly 90 as herein disclosed is again in its default or "at rest" condition with the handle 70 not yet squeezed or actuated to tighten or pull on the cable 92 (FIG. 2) and thus pull downwardly on the actuator 40. Those skilled in the art will further appreciate that essentially all of the foregoing steps of installing the transmission assembly 30 on the transmission T and then operably engaging the release bracket 110 with the park release lever L at one end and the actuator 40 of the transmission assembly 30 at the other end can conveniently be done with one hand, and whether right hand or left hand, which it will be appreciated is particularly advantageous in the tight quarters under the vehicle V (FIG. 12).

Figure 11:
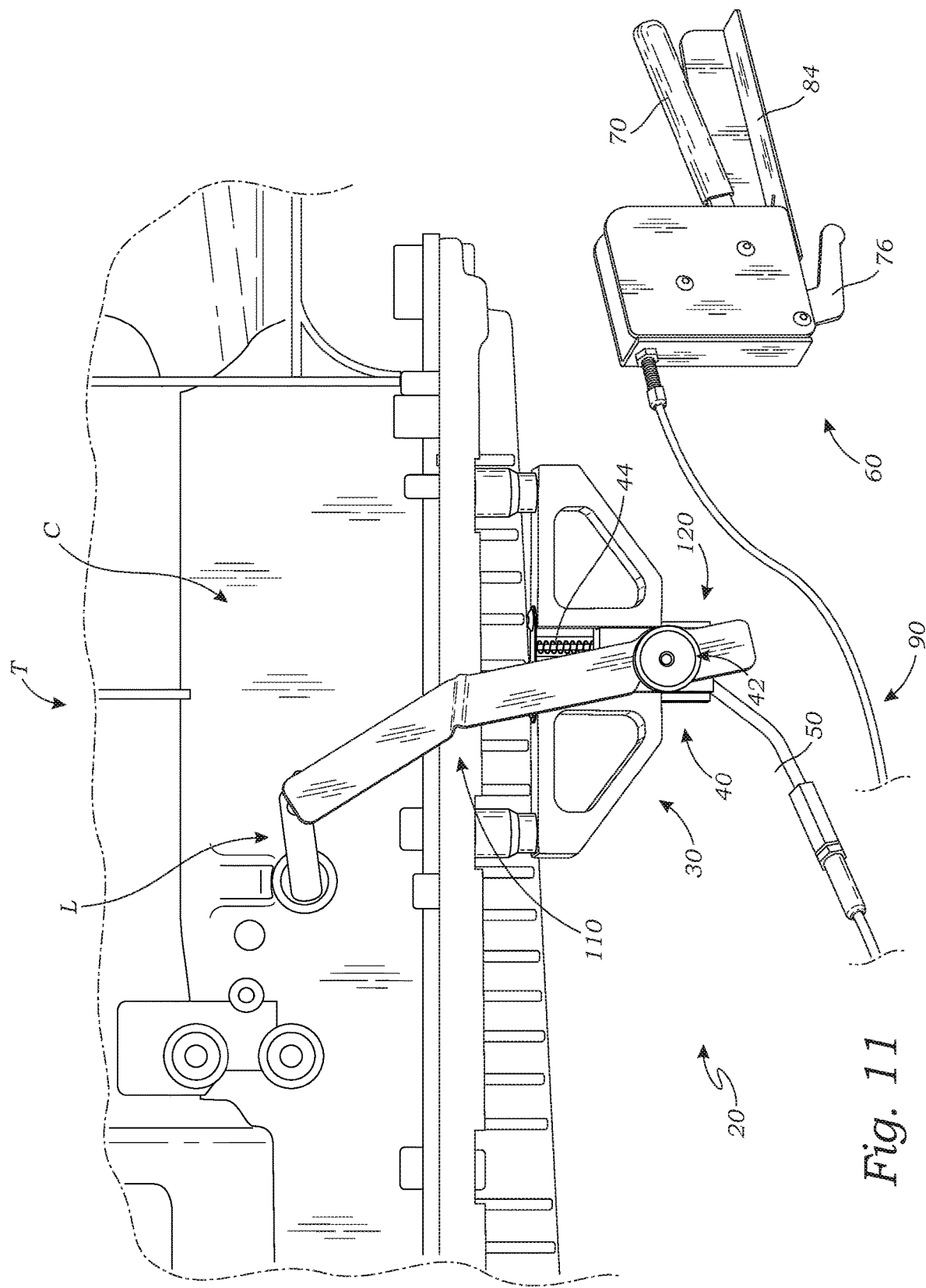
FIG. 11 is a reduced scale partial perspective view of the park release apparatus of FIG. 1 in a fourth operational mode as installed wherein the release bracket of FIGS. 8 and 9 is engaged with the park release lever at one end and at its opposite end is engaged with the actuator of the transmission assembly mounted on the transmission as in FIG. 7 and further wherein the handle assembly of FIG. 10 is operated so as to cause the actuator of the transmission assembly to shift downwardly, thereby causing the park release lever to shift downwardly, in accordance with at least one embodiment.
Figure 12:
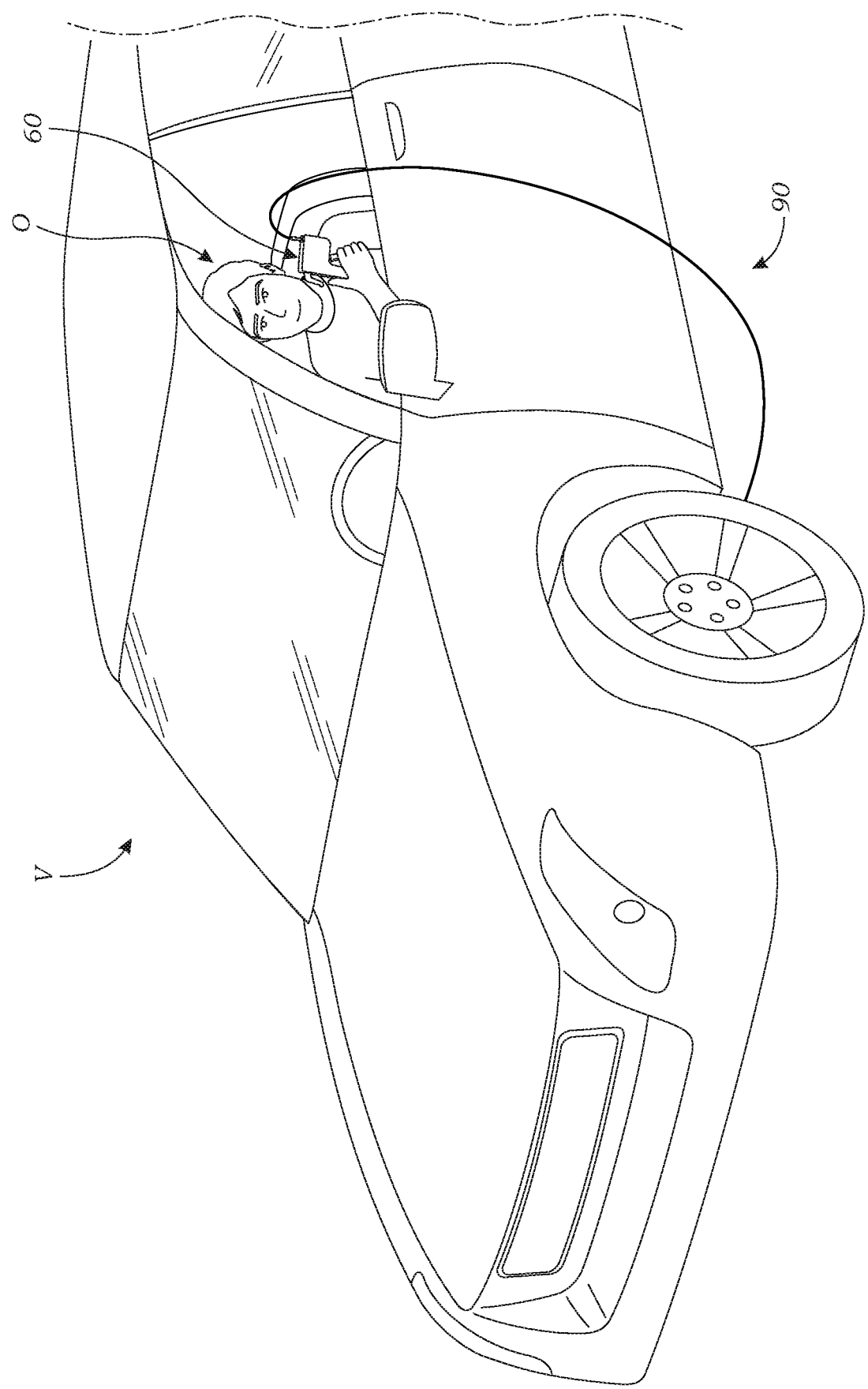
FIG. 12 is a further reduced scale partial perspective view of the park release apparatus of FIG. 1 in the fourth operational mode as installed of FIG. 11 with an operator seated within the vehicle and operating the park release apparatus via the grasped handle assembly, whereby the transmission is selectively shifted out of park into neutral and the vehicle may be selectively rolled, in accordance with at least one embodiment.

Therefore, turning next to FIG. 11, there is illustrated a fourth operational mode of the exemplary park release apparatus 20 according to aspects of the present invention wherein the handle assembly 60 has now been actuated as by squeezing or shifting the handle 70 toward the handle grip 84 against the handle biasing spring 74 (FIG. 4) to thereby pull proximally or put tension on and shift the cable 92 (FIG. 4) so as to pull on or downwardly shift the actuator 40 of the transmission assembly 30, in turn shifting the transmission park release lever L via the coupled release bracket 110 and taking the vehicle's transmission T out of park and into neutral. And as shown in FIG. 12, it will be appreciated that this operation of shifting the transmission T out of park can and preferably would be done by the operator O while safely inside the vehicle V so as to be able to operate the vehicle's brake (not shown) and thus prevent unwanted rolling of the vehicle V as its transmission T is shifted to neutral. The handle assembly 60 may be held and manually operated even from within the vehicle V by simply passing the handle assembly 60 and a portion of the cable assembly 90 through an open window as shown or an open door. It will again be appreciated that the cable assembly 90 may be of really any length but preferably is of sufficient length to comfortably run from the vehicle's transmission T where the transmission assembly 30 is mounted to the handle assembly 60 held by the operator O while seated in the vehicle V. To then put the vehicle V back in park as desired, the operator O need only release the handle 70, optionally via the handle release 76, on which basis the handle 70 and thus the actuator 40 and park release lever L return to the default position or third operational mode illustrated in FIG. 10. Accordingly, there is provided via the exemplary park release apparatus 20 according to aspects of the present invention a safe, convenient, and effective means of selectively taking a vehicle's transmission T out of park even when the park release lever L on the transmission T is otherwise not readily accessible without being under the vehicle V and even with the vehicle V not being operable (the engine not running). That is, through the after-market and typically temporary installation of the apparatus 20 on the vehicle V and specifically the transmission assembly 30 on the transmission T and the related release bracket 110 coupled with the transmission's park release lever L as herein described prior to ever attempting to take the vehicle V out of park and render it movable, such operation can be done relatively quickly and easily, again, without risk to the operator O. And as with the installation of the transmission assembly 30, it will be appreciated that then operating the handle assembly 60 to selectively shift the transmission T out of park may also conveniently be performed with one hand, whether right or left. Those skilled in the art will thus appreciate that a new and useful park release apparatus 20 has been disclosed, which may vary from the exemplary embodiment in one or more respects without departing from the spirit and scope of the present invention. Optionally, a wheel chuck (not shown) or other means of rendering the vehicle V immovable may be employed as the park release apparatus 20 is placed and/or operated as a further safety precaution.

Figure 13:
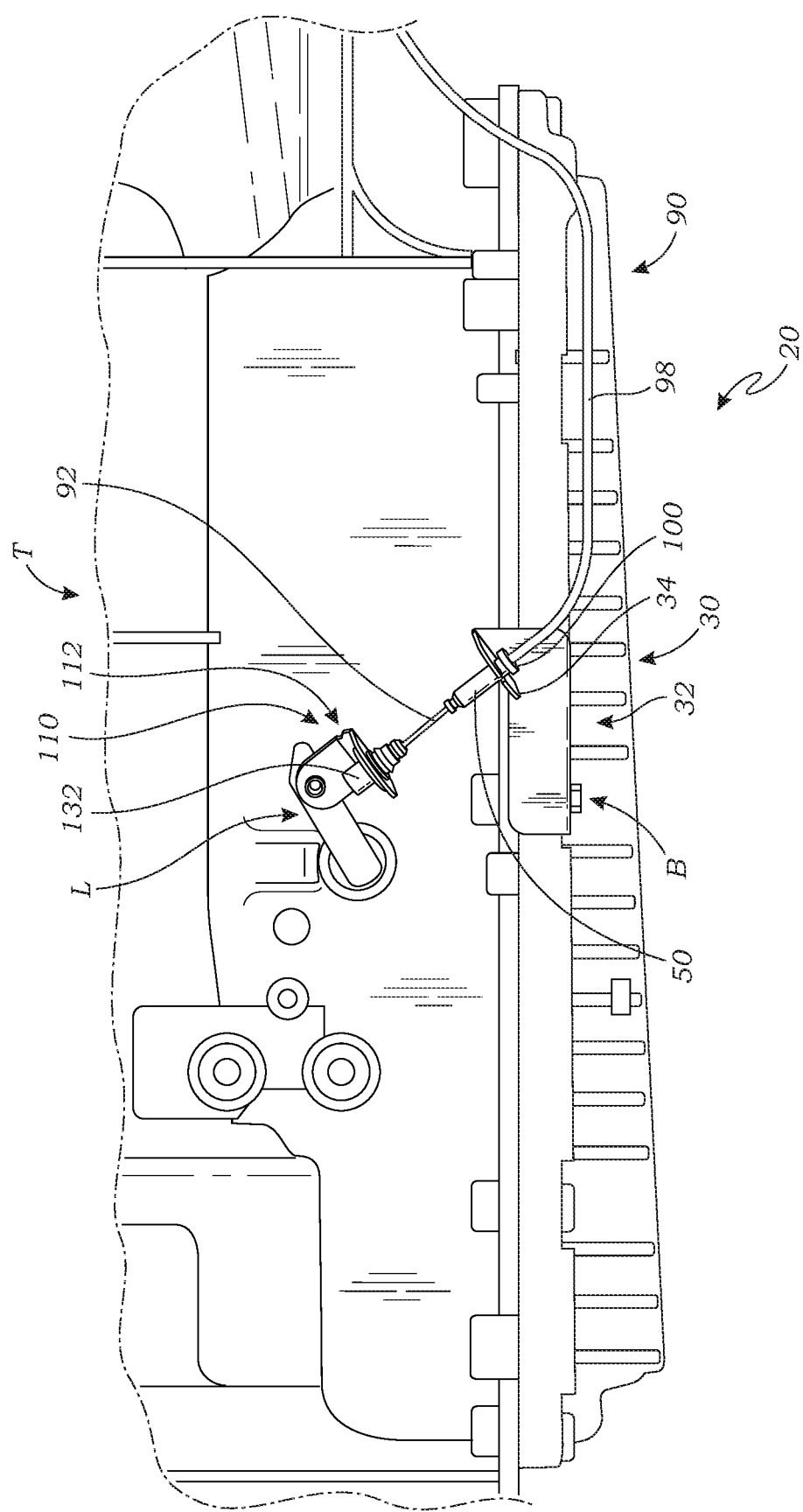
FIG. 13 is a reduced scale partial perspective view of an alternative exemplary park release apparatus in a third operational mode as installed wherein an alternative release bracket is engaged with the park release lever at one end and at its opposite end is engaged with the cable of the cable assembly, further showing an alternative transmission assembly mounted on the transmission through which the cable is operably installed, in accordance with at least one embodiment.

Referring now to FIG. 13, there is shown a partial perspective view of an alternative exemplary embodiment of a park release apparatus 20 according to aspects of the present invention, here showing particularly an alternative transmission assembly 30 as installed on a vehicle's transmission T so as to operably engage the park release lever L. Such an apparatus 20 may include any appropriate handle assembly 60 (FIGS. 1 and 15) operably connected to the transmission assembly 30 by a cable assembly 90. As shown in the illustrated embodiment, the alternative transmission assembly 30 of the park release apparatus 20 again generally comprises a transmission assembly body 32 in and through which the cable 92 of the cable assembly 90 operates, only here the illustrated body 32 is actually fastened to at least one of the transmission bolts B rather than being removably magnetically coupled thereto, though such installation is also equally possible as well as any other permanent or non-permanent installation technique, whether now known or later developed, and that for any of the illustrated transmission assemblies 30 or any other such assemblies according to aspects of the present invention. And rather than a release bracket 110 connected between the transmission assembly 30, and specifically a sliding actuator 40 thereof as in the first exemplary embodiment of the apparatus 20 of FIGS. 1-12, and the park release lever L, instead a release bracket 110 having a release bracket body 112 is installed on the park release lever L and configured to receive within a cable receiver 132 thereof the terminal or distal end 94 (FIG. 2) of the cable 92, with the cable 92 itself then passing proximally through a cable guide 50 formed on a first wall 34 of the transmission assembly body 32 so as to be oriented generally toward the park release lever L and the release bracket 110, and specifically the cable receiver 132 when the transmission assembly body 32 is installed on the transmission T substantially as shown in FIG. 13. Once more, the cable assembly 90 generally comprises a sheath 98 in which the cable 92 is slidably installed so as to be operably coupled between the transmission assembly 30 and the handle assembly 60. It will thus be appreciated that as with the first exemplary embodiment, in use in a third operational mode, the alternative exemplary overall park release apparatus 20 via the handle assembly 60 and the park release lever L itself is effectively biased toward the vehicle's transmission T remaining in park, or toward the configuration of such components in effectively the default or "at rest" position illustrated in FIG. 13. Accordingly, it will be appreciated that in the illustrated third operational mode of the park release apparatus 20, the transmission assembly 30 is effectively coupled with the park release lever L of the transmission T via the release bracket 110, and specifically the engagement of the cable 92 with the cable receiver 132, such that pulling on or tightening the cable 92 via the handle assembly 60 of whatever kind will translate via the release bracket 110 to pulling down on the park release lever L so as to shift the transmission T out of park and into neutral. Before doing so, and in the configuration of the park release apparatus 20 as shown in FIG. 13 that is prior to but ready for any such actuation, the handle assembly 60 operably coupled to the transmission assembly 30 through the cable assembly 90 as herein disclosed is again in its default or "at rest" condition. It will also be appreciated that with the transmission assembly 30 so installed on the transmission T and ready for use, the balance of the cable assembly 90 and the related handle assembly 60 may be stored in the engine compartment for use as needed or may also be somewhat permanently installed in the vehicle V as for example by running a portion of the cable assembly 90 and the handle assembly 60 into the passenger compartment and even installing the handle assembly 60 in or under the dash or console (not shown) so as to be selectively accessible to the operator O. Where the handle and cable assemblies 60, 90 are stored in the engine compartment when not in use, it will be appreciated that as the need arises, the operator O may simply open the hood, retrieve the handle assembly 60 and uncoil the cable assembly 90 as necessary, and feed the handle assembly 60 and a portion of the cable assembly 90 into the passenger cabin, again, whether through an open door or window, and then operate the handle assembly 90 as herein described to selectively release the vehicle V from park, again all while the operator O in this example maintains control of the vehicle's brake and steering. And again, in this illustrated alternative embodiment with the park release apparatus 20 somewhat "permanently" installed particularly as to the transmission assembly 30, it will be further appreciated that the added time and inconvenience of removing the under panel is avoided, such that manually taking the vehicle V out of park can be performed safely and conveniently in a matter of minutes. Once more, those skilled in the art will appreciate that a wide variety of such components and their assembly or operational engagement are possible according to aspects of the present invention, such that the exemplary embodiments shown and described are to be understood as illustrative and non-limiting.

Figure 14A:
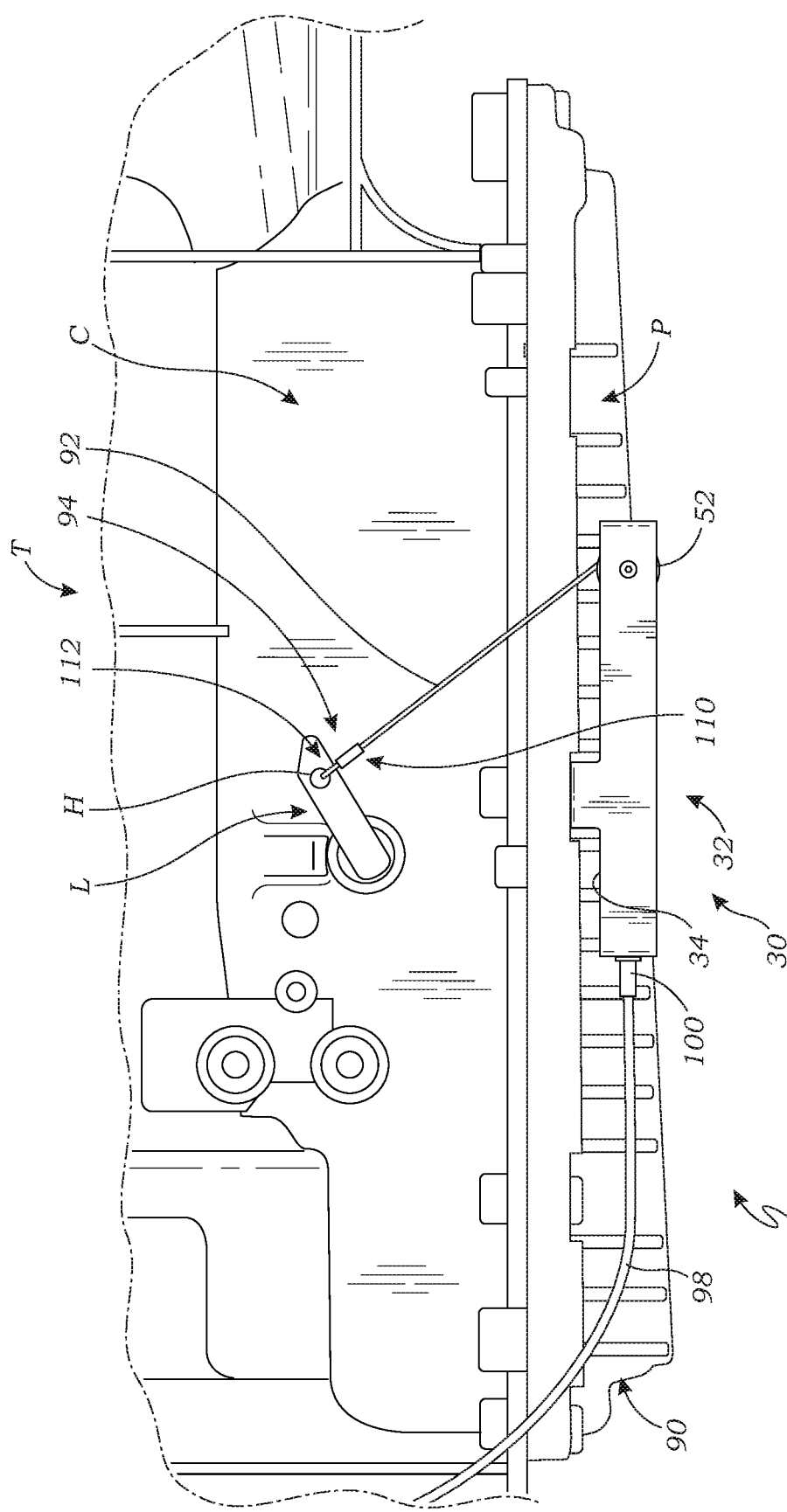
FIG. 14A is a reduced scale partial perspective view of a further alternative exemplary park release apparatus in a third operational mode as installed wherein a further alternative release bracket is engaged with the park release lever at one end and at its opposite end is engaged with the cable of the cable assembly, further showing a further alternative transmission assembly mounted on the transmission through which the cable is operably installed, in accordance with at least one embodiment.

Similarly, referring next to FIG. 14A, there is shown a partial perspective view of another alternative exemplary embodiment of a park release apparatus 20 according to aspects of the present invention, here again showing particularly an alternative transmission assembly 30 as installed on a vehicle's transmission T so as to operably engage the park release lever L. Such an apparatus 20 may once more include any appropriate handle assembly 60 (FIGS. 1 and 15) operably connected to the transmission assembly 30 by a cable assembly 90. As shown, the alternative transmission assembly 30 of the park release apparatus 20 again generally comprises a transmission assembly body 32 that is fastened to at least one of the transmission bolts B (FIG. 13), once again here shown as the central bolt B closest to the park release lever L, though again any permanent or non-permanent installation technique, whether now known or later developed, is possible. And rather than a release bracket 110 connected between the transmission assembly 30 and the park release lever L (FIGS. 7-11) or such bracket hardware mounted on the park release lever L (FIG. 13), instead a release bracket 110 formed with its release bracket body 112 as a clip is installed on the park release lever L by essentially passing the release bracket 110 or clip body 112 into or through the hole H formed in the park release lever L, the body 112 being further configured to engage or be installed on the terminal or distal end 94 of the cable 92, with the cable 92 itself then passing proximally over a cable pulley 52 formed or rotatably installed within the transmission assembly body 32 in a plane somewhat parallel to the transmission case C and at a location along the body 32 such that the cable 92 passing around the cable pulley 52 and extending toward the park release lever L so as to engage the hole H thereof is somewhat perpendicular to the primary axis of the lever L, though neither geometrical arrangement of the cable pulley 52 is necessarily so. Once more, the cable assembly 90 generally comprises a sheath 98 in which the cable 92 is slidably installed so as to be operably coupled between the transmission assembly 30 and the handle assembly 60. It will therefore again be appreciated that as with the first and second exemplary embodiments, in use in a third operational mode, the alternative exemplary overall park release apparatus 20 via the handle assembly 60 and the park release lever L itself is effectively biased toward the vehicle's transmission T remaining in park, or toward the configuration of such components in effectively the default or "at rest" position illustrated in FIG. 14A. Accordingly, it will be appreciated that in the illustrated third operational mode of the park release apparatus 20, the transmission assembly 30 is effectively coupled with the park release lever L of the transmission T via the release bracket 110, and specifically the engagement of the cable 92 with the clip-like release bracket body 112, such that pulling on or tightening the cable 92 via the handle assembly 60 of whatever kind will translate via the release bracket 110 to pulling down on the park release lever L so as to shift the transmission T out of park and into neutral. Again, before doing so, and in the configuration of the park release apparatus 20 as shown in FIG. 14 that is prior to but ready for any such actuation, the handle assembly 60 operably coupled to the transmission assembly 30 through the cable assembly 90 as herein disclosed is again in its default or "at rest" condition. It will also again be appreciated that with the transmission assembly 30 so installed on the transmission T and ready for use, the balance of the cable assembly 90 and the related handle assembly 60 may be stored in the engine compartment for use as needed or may also be somewhat permanently installed in the vehicle V as for example by running a portion of the cable assembly 90 and the handle assembly 60 into the passenger compartment and even installing the handle assembly 60 in or under the dash or console (not shown) so as to be selectively accessible to the operator O. Once more, those skilled in the art will appreciate that a wide variety of such components and their assembly or operational engagement are possible according to aspects of the present invention, such that the exemplary embodiments shown and described are to be understood as illustrative and non-limiting.

Figure 14B:
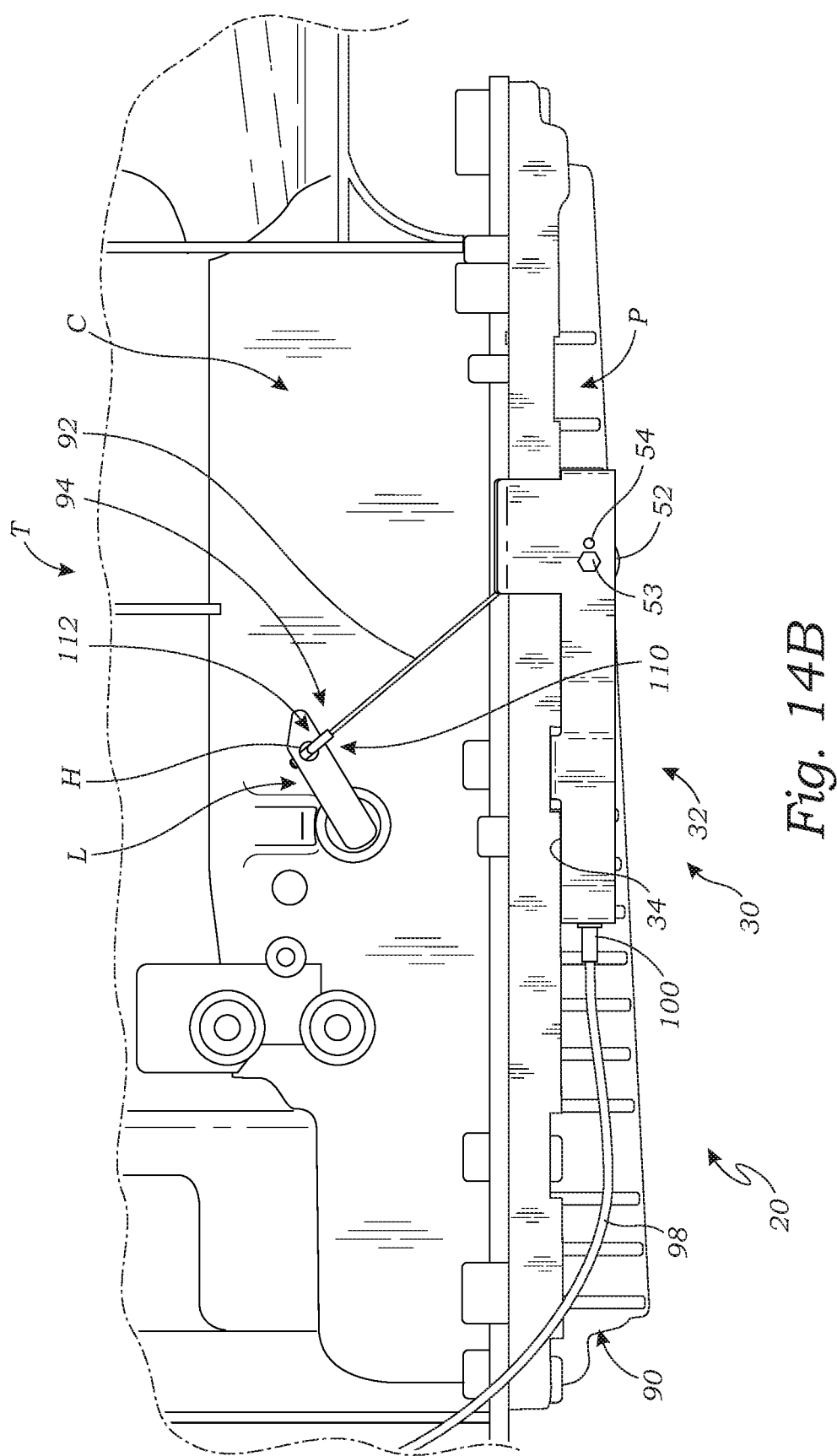
FIG. 14B is a reduced scale partial perspective view of a still further alternative exemplary park release apparatus in a third operational mode as installed wherein a still further alternative release bracket is engaged with the park release lever at one end and at its opposite end is engaged with the cable of the cable assembly, further showing a still further alternative transmission assembly mounted on the transmission through which the cable is operably installed, in accordance with at least one embodiment.
Figure 14C:
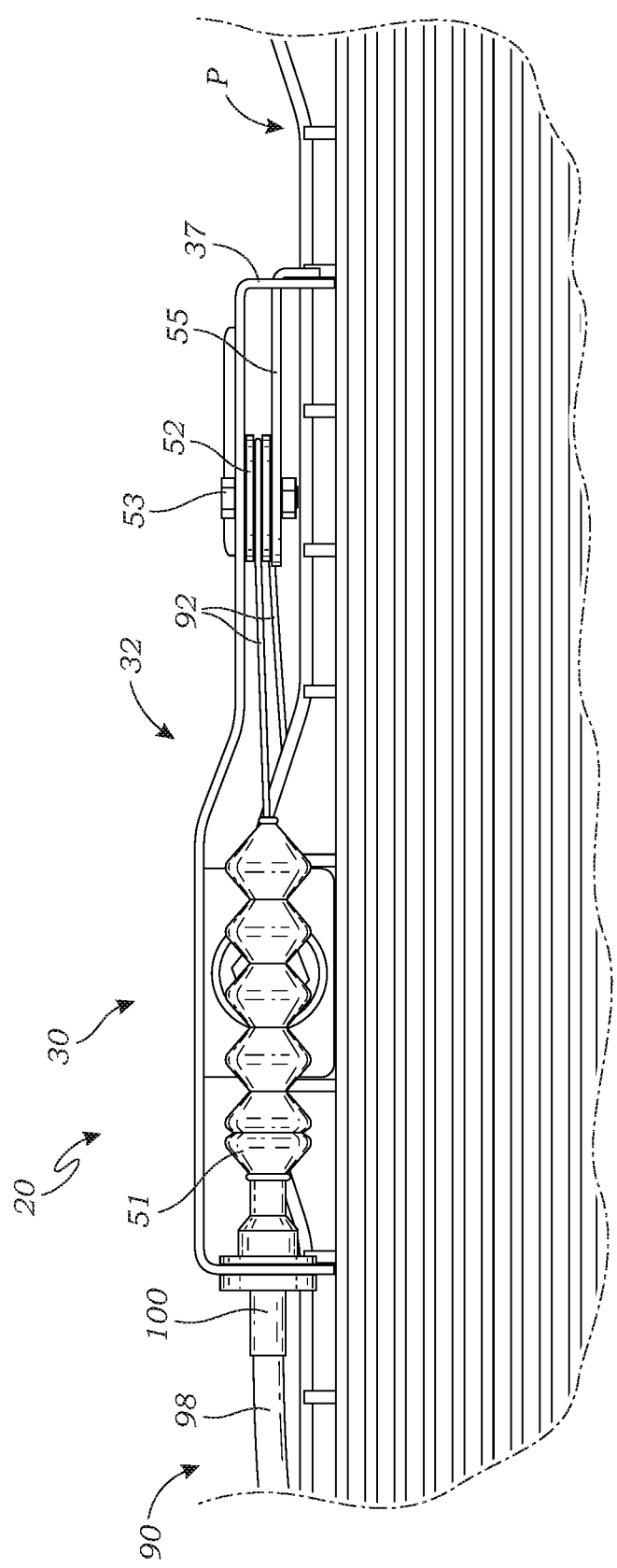
FIG. 14C is an enlarged bottom perspective view of the alternative transmission assembly of FIG. 14B, in accordance with at least one embodiment.
Figure 14D:
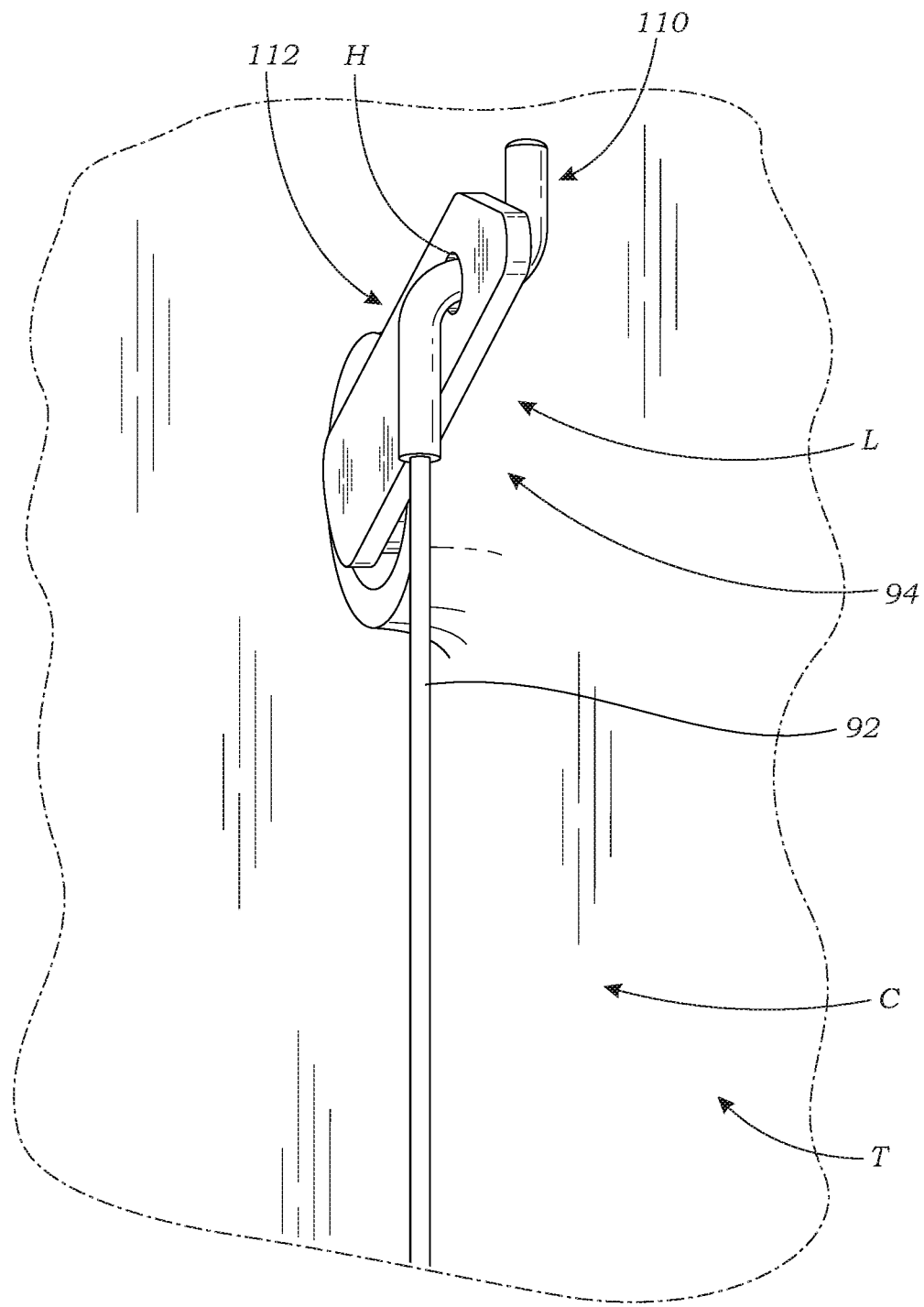
FIG. 14D is an enlarged partial perspective view of the alternative release bracket of FIG. 14B being engaged with a park release lever of the transmission, in accordance with at least one embodiment.

And referring further to FIGS. 14B-14D, there are shown perspective views of yet another alternative exemplary embodiment of a park release apparatus 20 according to aspects of the present invention, here somewhat like that of FIG. 14A and so again showing particularly an alternative transmission assembly 30 as installed on a vehicle's transmission T so as to operably engage the park release lever L. Such an apparatus 20 may once more include any appropriate handle assembly 60 (FIGS. 1 and 15) operably connected to the transmission assembly 30 by a cable assembly 90. As shown, the further alternative transmission assembly 30 of the park release apparatus 20 again generally comprises a transmission assembly body 32 that is fastened to at least one of the transmission bolts B (FIG. 13), once again here shown as the central bolt B closest to the park release lever L, though again any permanent or non-permanent installation technique, whether now known or later developed, is possible. More particularly, as best shown in FIG. 14B, here the transmission assembly body top or first wall 34 is configured in conjunction with that portion through which the central bolt B is fastened such that the first wall 34 is substantially in contact with the bottom or underside of the transmission pan P along the length of the transmission assembly body 32, providing stability and rigidity or resistance to flex of the transmission assembly body 32 as installed, even under loading or when the cable 92 of the cable assembly 90 is under tension during use as when shifting the transmission T out of park, as compared to the exemplary configuration of the transmission assembly 30 of FIG. 14A where there is a gap between the top wall 34 of the body 32 and the underside of the transmission pan P. And again, rather than a release bracket 110 connected between the transmission assembly 30 and the park release lever L (FIGS. 7-11) or such bracket hardware mounted on the park release lever L (FIG. 13) or even the exemplary clip configuration of the release bracket body 112 (FIG. 14A), here with particular reference to FIG. 14D, instead the release bracket 110 is formed with its release bracket body 112 as an "S" connector for removable installation on the park release lever L by essentially passing the release bracket 110 or "S" connector body 112 into or through the hole H formed in the park release lever L, the body 112 being further configured to engage or be installed on the terminal or distal end 94 of the cable 92. And as best seen in FIG. 14C, the cable 92 itself again passes proximally over a cable pulley 52 formed or rotatably installed within the transmission assembly body 32 in a plane somewhat parallel to the transmission case C and at a location along the body 32 such that the cable 92 passing around the cable pulley 52 and extending toward the park release lever L so as to engage the hole H thereof is somewhat perpendicular to the primary axis of the lever L, though neither geometrical arrangement of the cable pulley 52 is necessarily so. Moreover, in the illustrated alternative exemplary embodiment, at least a second mounting hole 54 is formed in the transmission assembly body 32 to provide an optional second location of the pulley 52 therealong, which it will be appreciated would in turn affect the angle of the cable 92 relative to the park release lever L, all else being equal. Further, within the transmission assembly body 32 adjacent to the cable pulley 52 a cable retainer 55 may be provided as installed spanning between the cable pulley bolt 53 and the transmission assembly body end wall 37, such that the cable 92 is trapped in relationship to the pulley 52 and so can reengage the pulley 52 even after substantial slack in the cable 92. And as further shown in FIG. 14C, a cable sleeve 51 may be provided over at least a portion of the exposed cable 92 to shield it from dirt and grime during operation of the vehicle V. Once more, the cable assembly 90 generally comprises a sheath 98 in which the cable 92 is slidably installed so as to be operably coupled between the transmission assembly 30 and the handle assembly 60. It will therefore again be appreciated that as with the other exemplary embodiments, in use in a third operational mode, the alternative exemplary overall park release apparatus 20 via the handle assembly 60 and the park release lever L itself is effectively biased toward the vehicle's transmission T remaining in park, or toward the configuration of such components in effectively the default or "at rest" position illustrated in FIG. 14B. Accordingly, it will be appreciated that in the illustrated third operational mode of the park release apparatus 20, the transmission assembly 30 is effectively coupled with the park release lever L of the transmission T via the release bracket 110, and specifically the engagement of the cable 92 with the "S" connector release bracket body 112, such that pulling on or tightening the cable 92 via the handle assembly 60 of whatever kind will translate via the release bracket 110 to pulling down on the park release lever L so as to shift the transmission T out of park and into neutral. Again, before doing so, and in the configuration of the park release apparatus 20 as shown in FIG. 14B that is prior to but ready for any such actuation, the handle assembly 60 operably coupled to the transmission assembly 30 through the cable assembly 90 as herein disclosed is again in its default or "at rest" condition. It will also again be appreciated that with the transmission assembly 30 so installed on the transmission T and ready for use, the balance of the cable assembly 90 and the related handle assembly 60 may be stored in the engine compartment for use as needed or may also be somewhat permanently installed in the vehicle V as for example by running a portion of the cable assembly 90 and the handle assembly 60 into the passenger compartment and even installing the handle assembly 60 in or under the dash or console (not shown) so as to be selectively accessible to the operator O. Once more, those skilled in the art will appreciate that a wide variety of such components and their assembly or operational engagement are possible according to aspects of the present invention, such that the exemplary embodiments shown and described are to be understood as illustrative and non-limiting.

Figure 15:
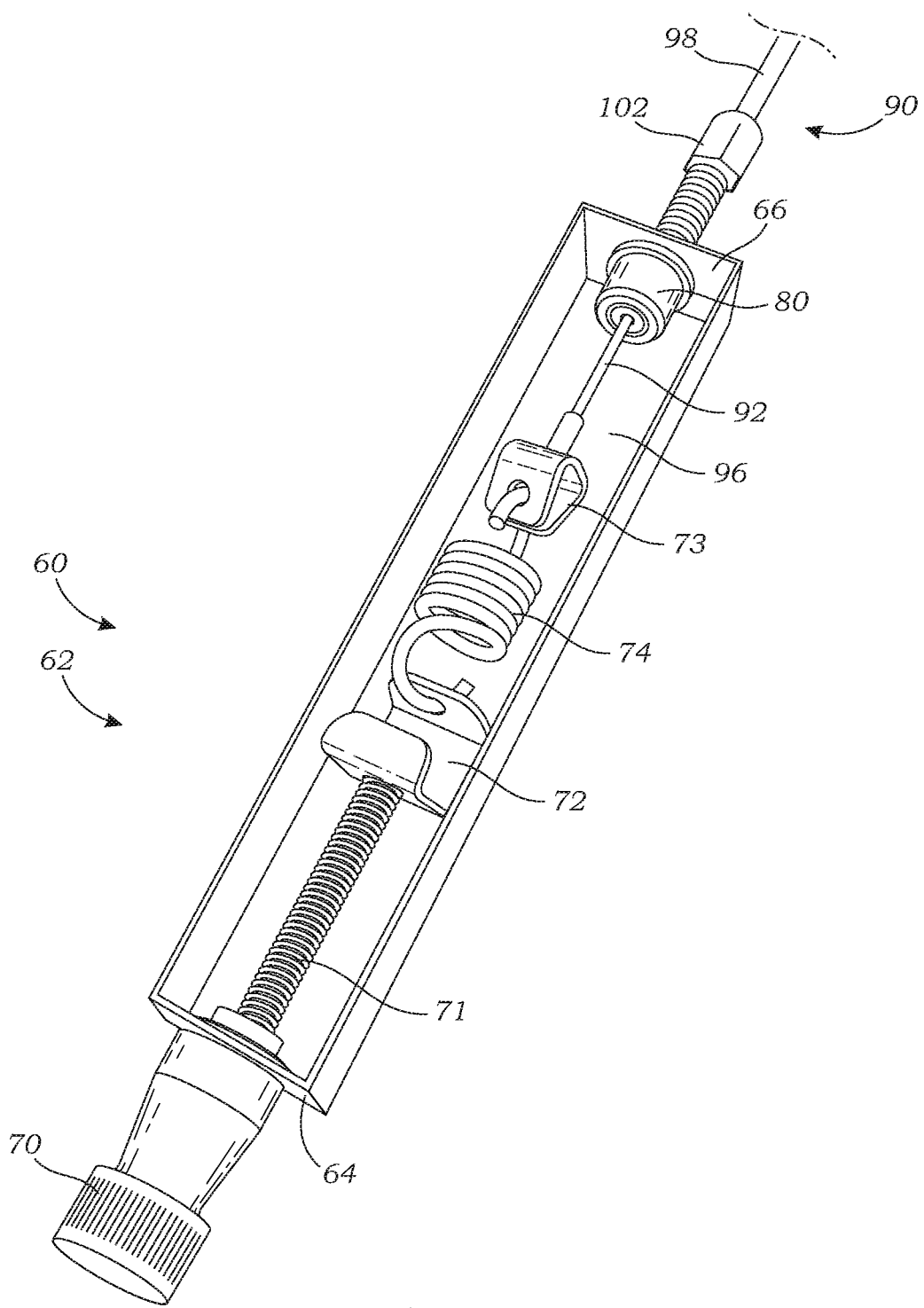
FIG. 15 is an enlarged perspective view of an alternative handle assembly thereof, in accordance with at least one embodiment.

Finally, turning to FIG. 15, there is shown an enlarged partial perspective view of an alternative exemplary handle assembly 60 of the exemplary park release apparatus 20 according to aspects of the present invention, "partial" in that for simplicity and ease of illustration the front wall or cover of the handle assembly body 62 is removed, and of course in that the balance of the apparatus 20 is not shown, which may be any transmission assembly 30 and related components according to aspects of the present invention, including any of the illustrated four embodiments. The illustrated handle assembly 60 again generally comprises a handle assembly body 62 in which is operably installed a rotatable handle 70 that operably engages one end of the cable assembly 90. The handle assembly body 62 comprises a first wall 64 on which the handle 70 is operably installed and a second wall 66 on which the cable assembly 90 is operably installed via the second connector 102, which body 62 may again be formed with additional walls and other features as needed or desired in a variety of configurations beyond that shown and described. Once again, the handle 70 is here rotatably mounted via a handle screw 71 that is threadably engaged with a first handle linkage 72 so as to take the first handle linkage 72 up or down or in or out. The first handle linkage 72 is in tern mechanically coupled to a second handle linkage 73 via a biasing or dampening handle spring 74. The second end 96 of the cable 92 is operably connected to the second handle linkage 73, such that as the handle linkage sub-assembly travels up or down within the handle assembly body 62 with the rotation of the handle 70 and handle screw 71 relative to the first handle linkage 72, it will be appreciated that such movement tightens or loosens or selectively puts tension on the cable 92 so as to in turn selectively shift the park release lever L. Accordingly, it will be appreciated that the location of the second connector 102 for operable installation of the cable assembly 90 with the handle assembly 60, or more particularly the cable sheath 98 with the second wall 66 of the handle assembly body 62, is substantially adjacent to or offset from the second handle linkage 73. As such, those skilled in the art will appreciate that with the cable 92 thus fed through the sheath 98 and second connector 102 so as to connect its second end 96 with the second handle linkage 73, rotating the handle 70 so as to shift the first and second handle linkages 72, 73 downwardly or away from the second connector 102 serves to shift the second end 96 of the cable 92 relative to the cable sheath 98 and second connector 102, and thus relative to the handle assembly body 62, thereby selectively pulling in or tightening the cable 92 to shift the park release lever L to neutral as herein described. As shown, the second wall 66 of the handle assembly body 62 may be further formed with a cable guide 80 opposite the second connector 102 to further facilitate alignment and smooth operation of the cable 92. It will be appreciated that the handle spring 74 here shown as a coil spring connected between the first and second handle linkages 72, 73 provides for a softening or dampening action of the rotatable handle 70 relative to the cable 90 via the linkages 72, 73, such that as tension is applied to the cable 92 or is let out via the handle 70 while applied via the park release lever L itself that is biased toward park, the loading on the cable 92 is at all times somewhat dampened, thereby allowing for smoother operation and mitigating against any tendency of the handle 70 or handle screw 71 to bind. Fundamentally, while the handle spring 74 might be seen as biasing the handle assembly 60 and thus the transmission assembly 30 toward shifting the park release lever L to neutral, it will be appreciate that the handle spring 74 is configured to have insufficient force to bias the park release lever L out of park to neutral, again, it instead simply dampening the operation of the handle assembly 60 while not overcoming the natural bias and default of the park release lever L in park. As such, it will be appreciated that in the alternative exemplary embodiment of the handle assembly 60, the overall park release apparatus 20 is still biased toward the handle 70 being opened and thus effectively toward the transmission T being in park, whereas the transmission T can be shifted out of park and temporarily or selectively placed in neutral as by rotatably actuating the handle 70 in cooperation with the linkage sub-assembly (first and second handle linkages 72, 73 and handle spring 74). More generally, it will again be appreciated that while a particular arrangement of the handle assembly 60 and its various components is shown and described, such is to be understood as merely illustrative of features and aspects of the present invention and expressly not limiting.

In closing, regarding the exemplary embodiments of the present invention as shown and described herein, it will be appreciated that a park release apparatus is disclosed and configured for enabling an operator to safely shift a vehicle's transmission from park to neutral even with the engine not operational and with the operator safely inside the vehicle so as to have control of the brake and steering, or the operator at least not under the vehicle. Because the principles of the invention may be practiced in a number of configurations beyond those shown and described, it is to be understood that the invention is not in any way limited by the exemplary embodiments, but is generally directed to a park release apparatus and is able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor(s) believe that the claimed subject matter is the invention.

What is claimed is:

1. A park release apparatus for shifting a transmission of a vehicle having an engine from park to neutral with the engine not running via a park release lever of the transmission, the apparatus comprising:
    a transmission assembly having a transmission assembly body for selective operable installation on the transmission spaced from the park release lever, wherein a selectively movable actuator is operably installed in the transmission assembly body;
    a handle assembly having a handle assembly body comprising a pivotable or rotatable handle;
    a cable assembly having a cable slidably installed within a sheath and a first connector coupling the sheath to the transmission assembly and an opposite second connector coupling the sheath to the handle assembly, the cable operably interfacing with the transmission assembly adjacent a cable first end and operably interfacing with the handle assembly adjacent a cable second end, wherein the cable first end is engaged with the actuator; and
    a release bracket having a release bracket body configured for being selectively coupled to the cable first end by selectively engaging the actuator and further configured for selectively engaging the park release lever, whereby in use with the transmission assembly installed on the transmission and the release bracket engaged with the park release lever selective actuation of the handle of the handle assembly shifts the cable second end and thereby increases tension on the cable and shifts the cable first end and thus the actuator and the coupled release bracket so as to in turn shift the transmission park release lever via the coupled release bracket and take the transmission of the vehicle out of park and into neutral.

2. The apparatus of claim 1 wherein the transmission assembly body is formed having at least one coupler for magnetic engagement with a bolt of the transmission.

3. The apparatus of claim 1 wherein the transmission assembly body is formed having a transmission assembly body first wall configured for installation of the transmission assembly on the transmission via a bolt of the transmission.

4. The apparatus of claim 3 wherein the transmission assembly body first wall is adjacent to a pan of the transmission when the transmission assembly is installed on the transmission.

5. The apparatus of claim 1 wherein:
    the transmission assembly body is formed having a transmission assembly body first wall and an opposite transmission assembly body second wall; and
    a channel is formed within the transmission assembly body between the first and second walls for slidable receipt of the actuator.

6. The apparatus of claim 5 wherein the actuator is biased proximally within the channel by an actuator spring, with a stop plate installed on the distal transmission assembly body first wall spanning the channel so as to retain the actuator and actuator spring within the channel.

7. The apparatus of claim 5 wherein installed on the proximal transmission assembly body second wall and extending proximally therefrom and positioned therealong so as to be offset from the channel is a cable guide, the sheath being operably installed on the cable guide via the first connector, whereby the cable slidably installed within the sheath of the cable assembly passes through the cable guide for operable engagement of the cable first end with the actuator within the channel.

8. The apparatus of claim 1 wherein an actuator post is formed on the actuator, the actuator post comprising a stud formed on the actuator and a cap formed on the stud to space the cap from the actuator to define an undercut between the cap and the actuator.

9. The apparatus of claim 8 wherein the release bracket body is formed as an elongate flat member having an outward surface and an opposite inward surface and having at a proximal release bracket body second end a notch intersecting the outward and inward surfaces, the notch configured for selective engagement with the actuator post, whereby the undercut of the stud is greater than or equal to the thickness of the release bracket body in the vicinity of the notch for selective positive engagement of the release bracket body notch with the actuator post of the actuator of the transmission assembly.

10. The apparatus of claim 9 wherein on the inward surface at an opposite distal release bracket body first end there are formed a distal engagement pin configured for selectively engaging a hole formed on the transmission park release lever and a proximal locator pin offset from the engagement pin and configured for selectively slidably engaging a bottom edge of the park release lever, whereby configuring the engagement pin to be spaced from the locator pin by an amount equivalent to the distance from the lever edge to the lever hole assures alignment of the engagement pin with the hole so long as the locator pin is in contact with the bottom edge of the lever.

11. The apparatus of claim 1 wherein the handle is operably installed on a handle assembly body first wall and the cable assembly is operably installed on a handle assembly body second wall via the second connector.

12. The apparatus of claim 11 wherein the handle is pivotally mounted on a fastener that is assembled on the handle assembly body first wall.

13. The apparatus of claim 12 wherein the handle is formed proximally with a handle linkage having at a free end thereof a cable terminus, the cable second end being connected to the cable terminus.

14. The apparatus of claim 13 wherein the second connector configured for operable installation of the cable assembly with the handle assembly, or more particularly the sheath with the handle assembly body second wall, is adjacent to the cable terminus installed in the free end of the handle linkage, whereby with the cable fed through the sheath and the second connector so as to connect the cable second end with the cable terminus operably installed in the handle linkage, pivoting the handle and thus the handle linkage about the fastener on which the handle is installed serves to shift the location of the cable terminus and thus the cable second end relative to the sheath and the second connector and thus relative to the handle assembly body, thereby selectively tensioning the cable.

15. The apparatus of claim 11 wherein the handle assembly body first wall is further formed with a handle grip opposite the handle to facilitate pivoting the handle as by squeezing the handle toward the grip.

16. The apparatus of claim 15 wherein the handle is configured to frictionally engage a separate handle release that is also pivotally installed on the handle assembly body first wall offset from the handle, the handle release serving to selectively engage and lock the handle in an actuated position against a handle spring configured to bias the handle away from the handle grip and thus bias the handle open and the cable toward the transmission assembly, whereby during use the apparatus is biased toward the handle being opened and thus effectively toward the transmission being in park, whereas the transmission can be shifted out of park and temporarily or selectively locked in neutral as by actuating the handle and the handle being locked against the biasing effect of the handle spring by the handle release.

17. The apparatus of claim 11 wherein the handle is rotatably mounted via a handle screw that is threadably engaged with a first handle linkage so as to shift the first handle linkage within the handle assembly body, the first handle linkage being coupled to a second handle linkage via a biasing handle spring, the cable second end being operably connected to the second handle linkage, whereby as the first and second handle linkages coupled by the handle spring shift within the handle assembly body with the rotation of the handle and thus the handle screw relative to the first handle linkage, such movement selectively tensions the cable so as to in turn selectively shift the park release lever.

18. The apparatus of claim 17 wherein the second connector configured for operable installation of the cable assembly with the handle assembly, or more particularly the sheath with the handle assembly body second wall, is adjacent to the second handle linkage, whereby with the cable fed through the sheath and the second connector so as to connect the cable second end with the second handle linkage, rotating the handle so as to shift the first and second handle linkages away from the second connector serves to shift the cable second end relative to the sheath and the second connector, and thus relative to the handle assembly body, thereby selectively tensioning the cable.

19. The apparatus of claim 18 wherein the handle assembly body second wall is further formed with a cable guide opposite the second connector to further facilitate alignment and smooth operation of the cable.

20. The apparatus of claim 17 wherein the handle spring is configured as a coil spring connected between the first and second handle linkages so as to provide for dampening action of the rotatable handle relative to the cable via the first and second handle linkages, whereby the loading on the cable is at all times somewhat dampened, thereby allowing for smoother operation of the handle and the handle screw.

21. A park release apparatus for shifting a transmission of a vehicle having an engine from park to neutral with the engine not running via a park release lever of the transmission, the apparatus comprising:
  a transmission assembly having a transmission assembly body for selective operable installation on the transmission spaced from the park release lever;
  a handle assembly having a handle assembly body comprising a pivotable or rotatable handle operably installed on a handle assembly body first wall formed with a handle grip opposite the handle to facilitate pivoting the handle as by squeezing the handle toward the grip;
  a cable assembly having a cable slidably installed within a sheath and a first connector coupling the sheath to the transmission assembly and an opposite second connector coupling the sheath to a handle assembly body second wall of the handle assembly, the cable operably interfacing with the transmission assembly adjacent a cable first end and operably interfacing with the handle assembly adjacent a cable second end; and
  a release bracket having a release bracket body configured for being selectively coupled to the cable first end and further configured for selectively engaging the park release lever, whereby in use with the transmission assembly installed on the transmission and the release bracket engaged with the park release lever selective actuation of the handle of the handle assembly shifts the cable second end and thereby increases tension on the cable and shifts the cable first end and thus the coupled release bracket so as to in turn shift the transmission park release lever via the coupled release bracket and take the transmission of the vehicle out of park and into neutral;
  wherein the handle is configured to frictionally engage a separate handle release that is also pivotally installed on the handle assembly body first wall offset from the handle, the handle release serving to selectively engage and lock the handle in an actuated position against a handle spring configured to bias the handle away from the handle grip and thus bias the handle open and the cable toward the transmission assembly, whereby during use the apparatus is biased toward the handle being opened and thus effectively toward the transmission being in park, whereas the transmission can be shifted out of park and temporarily or selectively locked in neutral as by actuating the handle and the handle being locked against the biasing effect of the handle spring by the handle release.

22. The apparatus of claim 21 wherein the cable passes proximally over a cable pulley rotatably installed within the transmission assembly body at a location along the transmission assembly body such that in use the cable passing around the cable pulley and extending toward the park release lever is approximately perpendicular to the park release lever.

23. The apparatus of claim 22 wherein an additional mounting hole is formed in the transmission assembly body to provide an optional second location of the cable pulley therealong.

24. The apparatus of claim 22 wherein a cable retainer is formed within the transmission assembly body adjacent to the cable pulley and spanning between the cable pulley and a transmission assembly body end wall, whereby the cable is trapped in relationship to the cable pulley and so can reengage the pulley even after substantial slack in the cable.

25. The apparatus of claim 22 wherein a cable sleeve is installed over at least a portion of the cable to shield the cable from dirt and grime during operation of the vehicle.

26. The apparatus of claim 21 wherein the release bracket body is installed on the park release lever and configured to receive within a cable receiver thereof the cable first end, with the cable then passing proximally through a cable guide formed on a transmission assembly body first wall so as to be oriented toward the park release lever and the release bracket cable receiver when the transmission assembly body is installed on the transmission, whereby the transmission assembly is effectively coupled with the park release lever of the transmission via engagement of the cable with the cable receiver.

27. The apparatus of claim 21 wherein the release bracket body comprises a clip formed on the cable first end and configured for insertion within a hole formed in the park release lever, whereby the transmission assembly is effectively coupled with the park release lever of the transmission via engagement of the clip with the park release lever.

28. The apparatus of claim 21 wherein the release bracket body comprises an "S" connector formed on the cable first end and configured for insertion within a hole formed in the park release lever, whereby the transmission assembly is effectively coupled with the park release lever of the transmission via engagement of the an "S" connector with the park release lever.

* * * * *